US011563875B2

(12) United States Patent
Saito

(10) Patent No.: US 11,563,875 B2
(45) Date of Patent: Jan. 24, 2023

(54) CAMERA ACTUATOR, CAMERA MODULE, AND CAMERA MOUNT DEVICE

(71) Applicant: Masahiro Saito, Tokyo (JP)

(72) Inventor: Masahiro Saito, Tokyo (JP)

(73) Assignee: MITSUMI ELECTRIC CO., LTD., Tokyo (JP)

(*) Notice: Subject to any disclaimer, the term of this patent is extended or adjusted under 35 U.S.C. 154(b) by 175 days.

(21) Appl. No.: 16/967,747

(22) PCT Filed: Feb. 1, 2019

(86) PCT No.: PCT/JP2019/003639
§ 371 (c)(1),
(2) Date: Aug. 6, 2020

(87) PCT Pub. No.: WO2019/155994
PCT Pub. Date: Aug. 15, 2019

(65) Prior Publication Data
US 2021/0058537 A1 Feb. 25, 2021

(30) Foreign Application Priority Data
Feb. 6, 2018 (JP) ............... JP2018-019305

(51) Int. Cl.
H04N 5/225 (2006.01)
G02B 7/02 (2021.01)
G03B 17/02 (2021.01)

(52) U.S. Cl.
CPC ............ *H04N 5/2254* (2013.01); *G02B 7/02* (2013.01); *G03B 17/02* (2013.01)

(58) Field of Classification Search
CPC ...... H04N 5/2254; H04N 5/2257; G02B 7/02; G02B 27/646
See application file for complete search history.

(56) References Cited

U.S. PATENT DOCUMENTS 5,604,641 A * 2/1997 Matsui ............... G11B 7/0932
359/814
5,777,806 A * 7/1998 Ikegame ............ G11B 7/0932
359/813

(Continued)

FOREIGN PATENT DOCUMENTS

JP 6-314432 A 11/1994
JP 2005182926 A 7/2005

(Continued)

OTHER PUBLICATIONS

International Search Report from International Application No. PCT/JP2019/003639 dated Apr. 23, 2019.

*Primary Examiner* — Twyler L Haskins
*Assistant Examiner* — Dwight Alex C Tejano
(74) *Attorney, Agent, or Firm* — Brundidge & Stanger, P.C.

(57) ABSTRACT

A camera actuator comprises: a fixed-side member; a movable-side member disposed separated from the fixed-side member in a direction orthogonal to a light axis, the movable-side member holding a lens unit; a first lens drive actuator that displaces the movable-side member in at least a prescribed direction; an elastic support member that extends in the direction orthogonal to the light axis, and supports the movable-side member in relation to the fixed-side member so as to allow the displacement in at least the prescribed direction; and a gel-like first damping member provided to the elastic support member.

14 Claims, 11 Drawing Sheets

(56) References Cited

U.S. PATENT DOCUMENTS

| | | | |
|---|---|---|---|
| 2006/0181632 A1* | 8/2006 | Makii | G02B 7/02 |
| | | | 348/335 |
| 2006/0268431 A1* | 11/2006 | Jin | G02B 27/646 |
| | | | 359/726 |
| 2009/0122406 A1* | 5/2009 | Rouvinen | G03B 17/17 |
| | | | 359/555 |
| 2009/0231537 A1* | 9/2009 | Yamamiya | G03B 17/00 |
| | | | 349/200 |
| 2010/0118402 A1* | 5/2010 | Washisu | G02B 27/646 |
| | | | 359/557 |
| 2010/0321751 A1* | 12/2010 | Yamada | G02B 26/101 |
| | | | 359/200.7 |
| 2011/0097062 A1 | 4/2011 | Tsuruta | |
| 2015/0042870 A1* | 2/2015 | Chan | G02B 26/0816 |
| | | | 359/733 |
| 2016/0291344 A1* | 10/2016 | Terajima | G02B 27/646 |
| 2017/0153409 A1* | 6/2017 | Chan | G02B 7/04 |
| 2018/0024329 A1* | 1/2018 | Goldenberg | G02B 13/16 |
| | | | 359/557 |
| 2019/0212632 A1* | 7/2019 | Miller | H04N 5/2253 |

FOREIGN PATENT DOCUMENTS

| | | | |
|---|---|---|---|
| JP | 2009283072 A | 12/2009 | |
| JP | 2013246313 A | 12/2013 | |
| JP | 2015-092285 A | 5/2015 | |
| JP | 2016188989 A | 11/2016 | |
| JP | 2017-102444 A | 6/2017 | |
| WO | 2009133691 A1 | 11/2009 | |

* cited by examiner

CAMERA ACTUATOR, CAMERA MODULE, AND CAMERA MOUNT DEVICE

TECHNICAL FIELD

The present invention relates to a camera actuator, a camera module, and a camera-mounted apparatus.

BACKGROUND ART

Conventionally, a thin camera-mounted apparatus on which a camera module is mounted, such as a smartphone and a digital camera, has been known. The camera module includes a lens part including one or more lenses, and an imaging element that captures a subject image formed by the lens part.

Further, a camera module including a bending optical system has also been proposed in which light from a subject along a first optical axis is bent in a direction of a second optical axis and is guided to a lens part at a subsequent stage through a prism that is an optical path bending member provided at a stage prior to the lens part (for example, Patent Literature (hereinafter, referred to as "PTL") 1).

The camera module disclosed in PTL 1 includes a shake correction apparatus that corrects camera shake generated in the camera, and an autofocus apparatus that performs autofocusing. Such a camera module includes a shake correction actuator and an autofocus actuator as camera actuators. Of these, the shake correction actuator includes a first actuator and a second actuator that swing the prism about two different axes. When camera shake is generated in the camera, the shake correction actuator swings the prism under the control of a control section. Consequently, the camera shake generated in the camera is corrected.

CITATION LIST

Patent Literature

PTL 1
Japanese Patent Application Laid-Open No. 2015-92285

SUMMARY OF INVENTION

Technical Problem

In the camera actuator disclosed in PTL 1 as described above, it is desired to suppress resonance generated during operation of the camera actuator.

An object of the present invention is to provide a camera actuator, a camera module, and a camera-mounted apparatus capable of suppressing resonance generated during operation of an actuator.

Solution to Problem

One aspect of a camera actuator according to the present invention includes: a fixed-side member; a movable-side member arranged apart from the fixed-side member in a direction orthogonal to an optical axis and holding a lens part; a first lens driving actuator that displaces the movable-side member in at least a prescribed direction; an elastic support member extending in the direction orthogonal to the optical axis and supporting the movable-side member on the fixed-side member so as to allow displacement of the movable-side member in at least the prescribed direction; and a first damping member that is gel-like and is provided in the elastic support member.

One aspect of a camera module according to the present invention includes: the camera actuator described above; and an imaging element arranged at a stage subsequent to the lens part.

One aspect of a camera-mounted apparatus according to the present invention includes: the camera module described above; and a control section that controls the camera module.

Advantageous Effects of Invention

According to the present invention, it is possible to provide a camera actuator, a camera module, and a camera-mounted apparatus capable of suppressing resonance generated during operation of an actuator.

DESCRIPTION OF EMBODIMENTS

Figure 1:
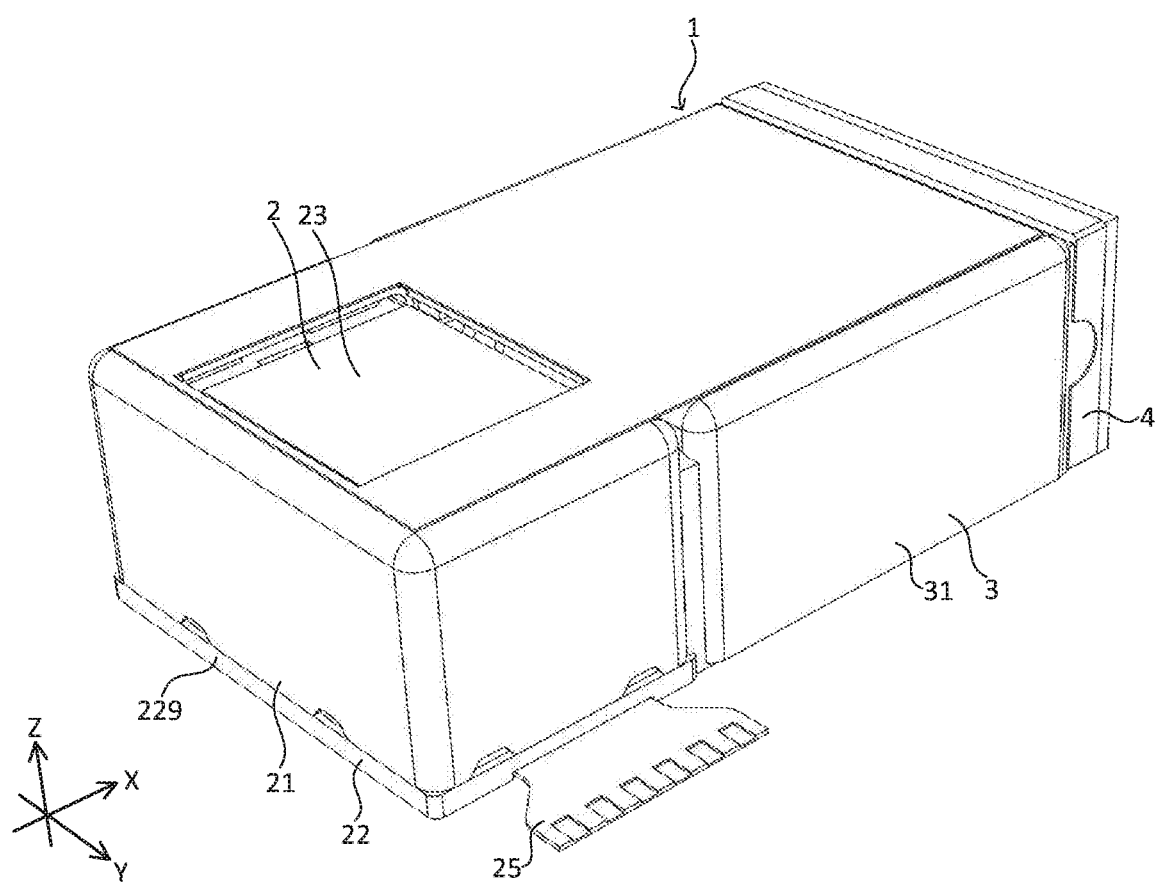
FIG. 1 is a perspective view of a camera module according to an embodiment of the present invention.
Figure 2:
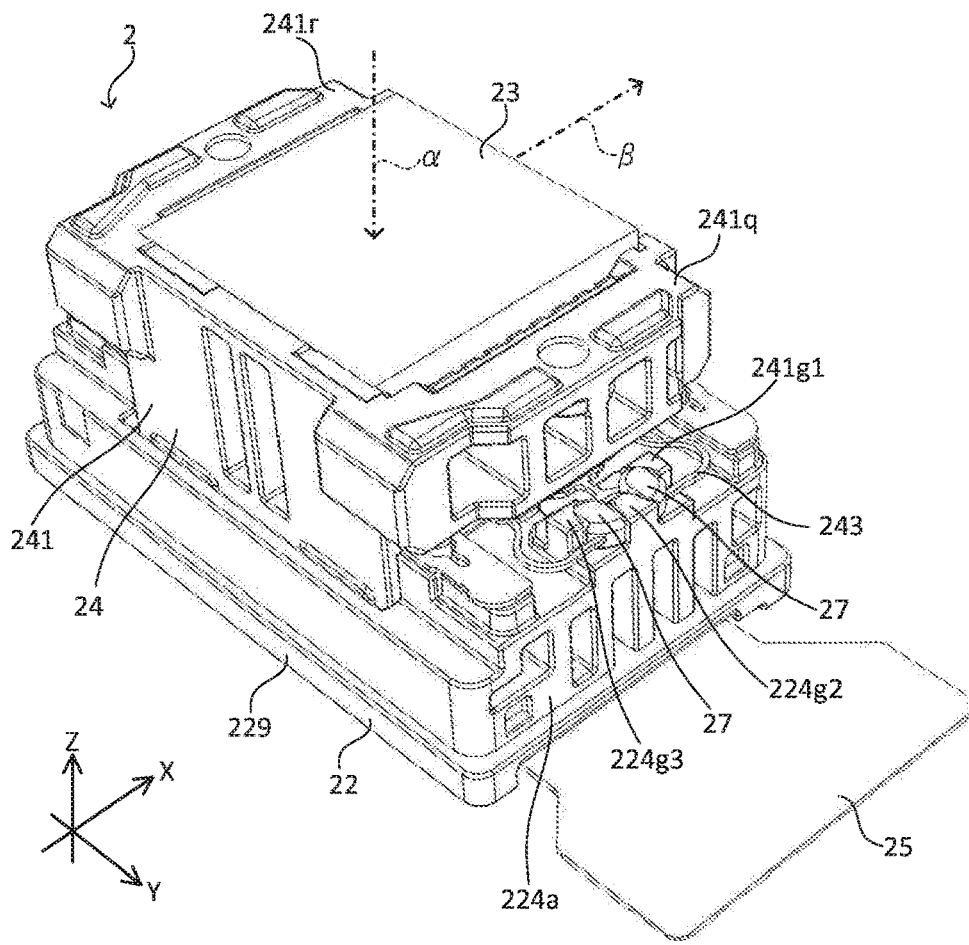
FIG. 2 is a perspective view of a prism module of the camera module in a state in which some members are omitted from the prism module.
Figure 3:
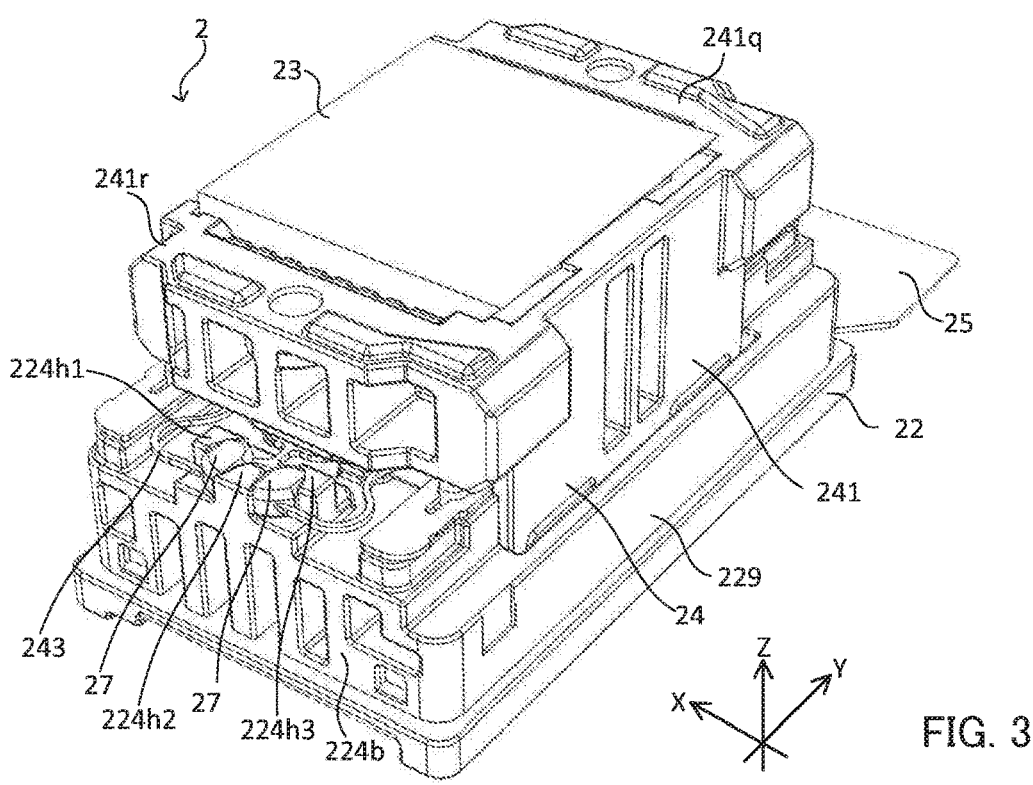
FIG. 3 is a perspective view of the prism module from which some members are omitted, in a state in which the prism module is viewed from an angle different from that in FIG. 2.

Hereinafter, an embodiment according to the present invention will be described in detail with reference to the accompanying drawings.

Embodiment

A camera module according to an embodiment of the present invention will be described with reference to FIGS. 1 to 18. Hereinafter, an outline of camera module 1 and then specific structures of prism module 2, lens module 3, and imaging element module 4 included in camera module 1 will be described. Note that, the camera actuator, the camera module, and the camera-mounted apparatus according to the present invention may include all configurations to be described later or may not include some of the configurations.

Camera Module

Camera module 1 is mounted on a thin camera-mounted apparatus, for example, smartphone M (see FIG. 18), a mobile phone, a digital camera, a notebook computer, a tablet terminal, a portable game machine, an in-vehicle camera or the like.

Hereinafter, each component of camera module 1 of the present embodiment will be described based on a state in which each component is incorporated in camera module 1. Further, in the description of the structure of camera module 1 of the present embodiment, an orthogonal coordinate system (X, Y, Z) is used. The drawings to be described later are also illustrated with a common orthogonal coordinate system (X, Y, Z).

In a case where the camera-mounted apparatus is used to take a picture in practice, camera module 1 is mounted such that the X direction is the left-right direction, the Y direction is the up-down direction, and the Z direction is the front-rear direction, for example. Light from a subject enters prism 23 of prism module 2 from the + side (plus side) in the Z direction as indicated by long dashed short dashed line α (also referred to as first optical axis) in FIG. 2. The light incident on prism 23 is bent at optical path bending surface 231 (see FIG. 8) of prism 23 as indicated by long dashed short dashed β (also referred to as second optical axis) in FIGS. 2 and 9 and is guided to lens part 33 of lens module 3 arranged at a stage subsequent to (that is, the + side in the X direction) prism 23. A subject image formed by lens part 33 (see FIG. 9) is then captured by imaging element module 4 (see FIG. 1) arranged at a stage subsequent to lens module 3.

Camera module 1 described above performs shake correction (optical image stabilization (OIS)) using first shake correction apparatus 24 (see FIG. 2) incorporated in prism module 2 and second shake correction apparatus 37 (see FIG. 11) incorporated in lens module 3. Further, camera module 1 described above performs autofocusing by displacing lens part 33 in the X direction using AF apparatus 36 (see FIG. 11) incorporated in lens module 3.

Hereinafter, prism module 2, lens module 3, and imaging element module 4 included in camera module 1 of the present embodiment will be described with reference to FIGS. 1 to 18.

Prism Module

Prism module 2 of the camera module according to the present embodiment includes first cover 21, first base 22, prism 23, and first shake correction apparatus 24.

First Cover

As illustrated in FIG. 1, first cover 21 is a box-shaped member that is made of, for example, a synthetic resin or a nonmagnetic metal, and is open on the both sides in the Z direction and on the + side in the X direction. Light from a side of the subject can enter an internal space of first cover 21 through an opening on the + side in the Z direction of first cover 21. First cover 21 as described above is combined with first base 22 to be described later from the + side in the Z direction.

First Base

Figure 5:
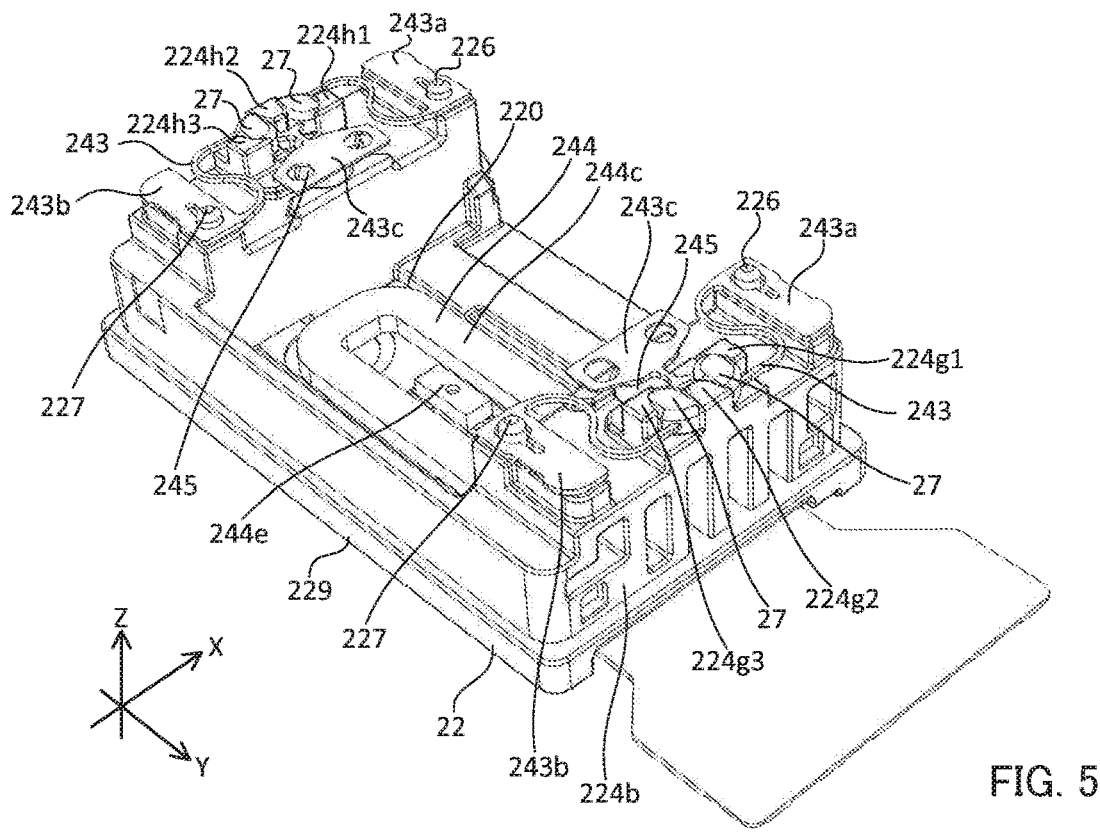
FIG. 5 is a perspective view of the first base.
Figure 6:
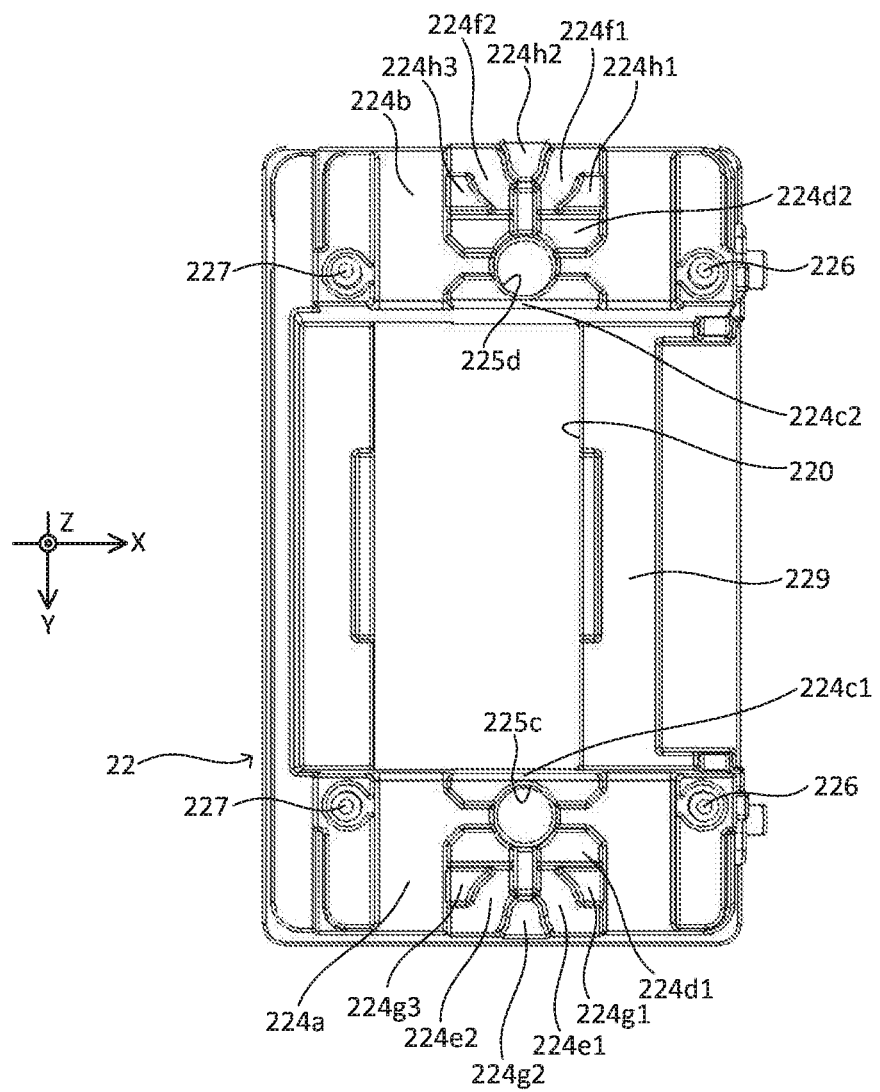
FIG. 6 is a plan view of the first base.

First base 22 will be described with reference to FIGS. 5 and 6. First base 22 is a box-shaped member that is open on the + side in the Z direction and on the + side in the X direction, respectively. First base 22 includes base-side opening 220 in bottom wall part 229 on the − side in the Z direction.

In the case of the present embodiment, first coil 244c and first Hall element 244e of first actuator 244 are arranged in base-side opening 220.

First base 22 supports holder 241 of first shake correction apparatus 24 to be swingable about a first axis parallel to the Y direction. For this purpose, first base 22 includes first receiver part 225c and second receiver part 225d for holding swing guide member 245 to be described later.

First receiver part 225c is provided in first side wall part 224a on the + side in the Y direction of first base 22. On the other hand, second receiver part 225d is provided in first side wall part 224b on the − side in the Y direction of first base 22.

First receiver part 225c and second receiver part 225d as such have shapes symmetrical with each other in the Y direction. Specifically, first receiver part 225c and second receiver part 225d are cylindrical recesses that open only on end surfaces (upper surfaces) on the + side in the Z direction of first side wall part 224a and first side wall part 224b, respectively.

First side wall part 224a includes first weir part 224c1 between an inner end edge in the Y direction and first receiver part 225c on the upper surface. On the other hand, first side wall part 224b includes first weir part 224c2 between an inner end edge in the Y direction and second receiver part 225d on the upper surface. Each of first weir part 224c1 and first weir part 224c2 contributes to prevention of an adhesive that fixes swing guide member 245 to first receiver part 225c and second receiver part 225d from flowing on a center side in the Y direction.

First side wall part 224a includes second weir part 224d1 in a portion surrounding a part of an outer half part in the Y direction of first receiver part 225c on the upper surface. On the other hand, first side wall part 224b includes second weir part 224d2 in a portion surrounding a part of an outer half part in the Y direction of second receiver part 225d on the upper surface. Each of second weir part 224d1 and second weir part 224d2 contributes to prevention of an adhesive that fixes swing guide member 245 to first receiver part 225c and second receiver part 225d from flowing into the outside in the Y direction.

First side wall part 224a includes spring positioning spaces 224e1 and 224e2 in a portion on an outer side in the Y direction of second weir part 224d1 on the upper surface. In the case of the present embodiment, spring positioning space 224e1 and spring positioning space 224e2 are separated in the X direction.

On the other hand, first side wall part 224b includes spring positioning spaces 224f1 and 224f2 in a portion on an outer side in the Y direction of second weir part 224d2 on the upper surface. Spring positioning space 224f1 and spring positioning space 224f2 are separated in the X direction. In each of spring positioning spaces 224e1 and 224e2 and spring positioning spaces 224f1 and 224f2, a part (specifically, base end-side continuous part 243j1) of continuous part 243i of swing support spring 243 (see FIG. 7) to be described later is arranged.

First side wall part 224a includes three protrusions 224g1, 224g2 and 224g3 in this order from the + side in the X direction in the portion on the outer side in the Y direction of second weir part 224d1 on the upper surface. Protrusion 224g1 and protrusion 224g3 are separated in the X direction and are arranged at the same position in the Y direction. Protrusion 224g2 is located on an outer side in the Y direction (the lower side in FIG. 6) of protrusion 224g1 and protrusion 224g3.

Spring positioning space 224e1 is present between protrusion 224g1 and protrusion 224g2. On the other hand, spring positioning space 224e2 is present between protrusion 224g2 and protrusion 224g3.

First side wall part 224b includes three protrusions 224h1, 224h2 and 224h3 in this order from the + side in the X direction in the portion on the outer side in the Y direction of second weir part 224d2 on the upper surface. Protrusion 224h1 and protrusion 224h3 are separated in the X direction and are arranged at the same position in the Y direction. Protrusion 224h2 is located on an outer side in the Y direction (the upper side in FIG. 6) of protrusion 224h1 and protrusion 224h3.

Spring positioning space 224f1 is present between protrusion 224h1 and protrusion 224h2. On the other hand, spring positioning space 224f2 is present between protrusion 224h2 and protrusion 224h3.

Each of first side wall parts 224a and 224b includes first positioning protrusion 226 and second positioning protrusion 227 in both end parts in the X direction on the upper surface. Each of first positioning protrusion 226 and second positioning protrusion 227 engages with a pair of swing support springs 243 (see FIG. 7) to be described later to position the pair of swing support springs 243.

First Shake Correction Apparatus

Figure 4:
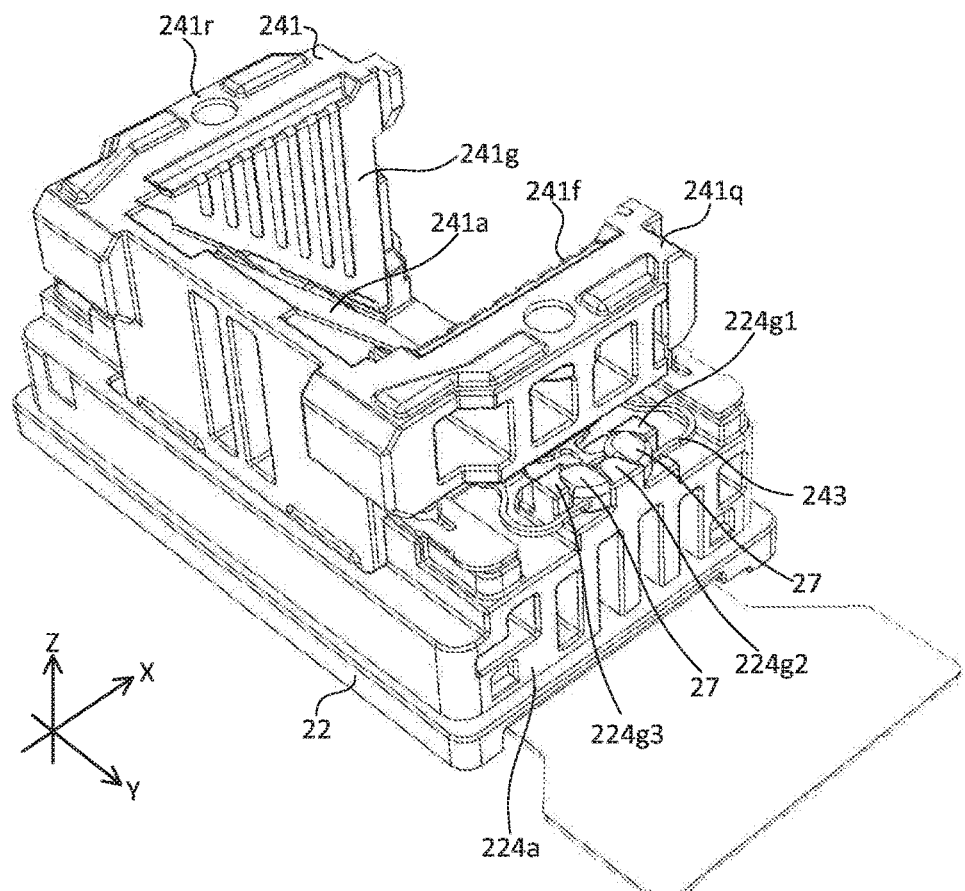
FIG. 4 is a perspective view of a state in which a holder is assembled to a first base.
Figure 8:
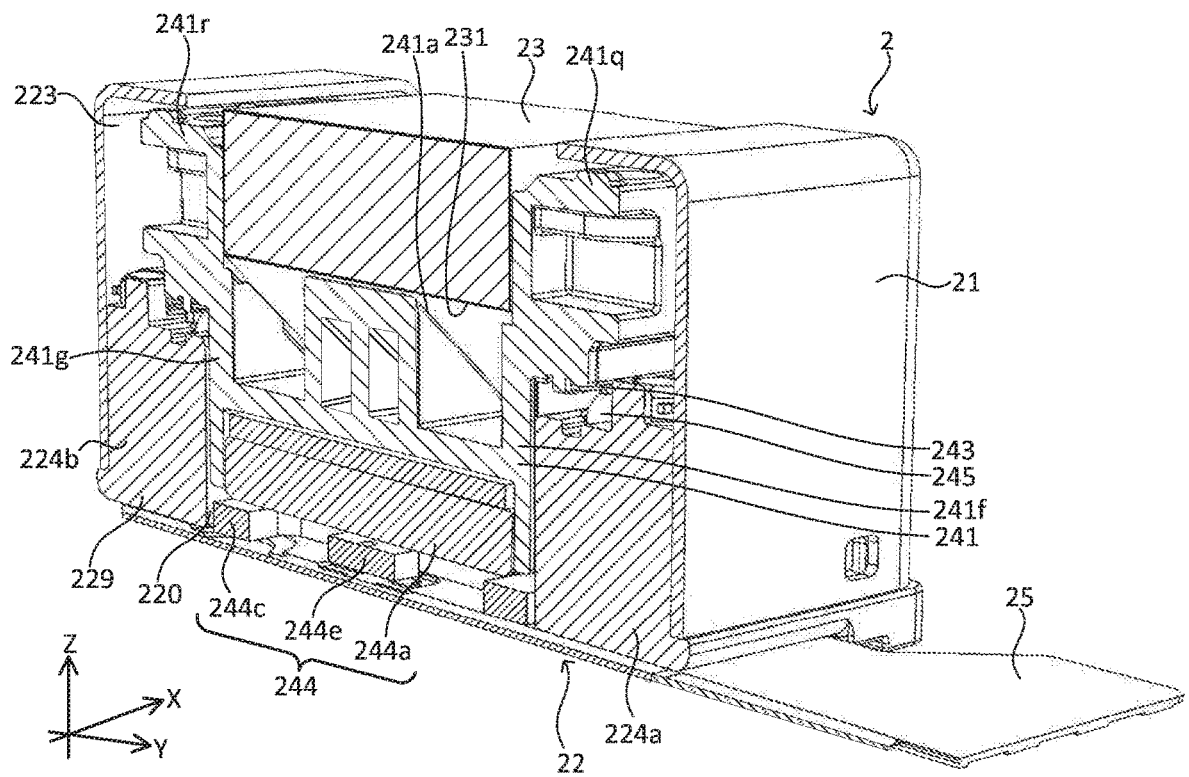
FIG. 8 is a cross-sectional view of the prism module.

First shake correction apparatus 24 will be described with reference to FIGS. 4, 5 and 8. First shake correction apparatus 24 swings prism 23 about the first axis parallel to the Y direction, and performs shake correction in the rotational direction about the first axis. First shake correction apparatus 24 as such is arranged in first accommodation space 223 (see FIG. 8) covered by first base 22 and first cover 21.

First shake correction apparatus 24 includes a pair of swing guide members 245, the pair of swing support springs 243, holder 241, and first actuator 244.

In first shake correction apparatus 24, holder 241 is supported by first base 22 so as to be swingable. In this state, holder 241 swings about the first axis based on driving force of first actuator 244. When first actuator 244 is driven under the control by a control section (not illustrated), holder 241 and prism 23 swing about the first axis parallel to the Y direction. Thus, shake in the rotational direction about the first axis is corrected. Hereinafter, specific structures of the respective members included in first shake correction apparatus 24 will be described.

Swing Guide Member

The pair of swing guide members 245 will be described with reference to FIGS. 5 and 6. Each of the pair of swing guide members 245 is, for example, a sphere made of a ceramic, a metal, or a synthetic resin. Swing guide member 245 that is one (that is, on the + side in the Y direction) of the pair of swing guide members 245 is arranged in first receiver part 225c of first base 22. On the other hand, swing guide member 245 that is the other (that is, on the − side in the Y direction) of the pair is arranged in second receiver part 225d of first base 22.

The pair of swing guide members 245 is fixed to first receiver part 225c and second receiver part 225d, respectively, with an adhesive. In this state, half parts on the + side in the Z direction of the pair of swing guide members 245 are swing guide surfaces. The swing guide surfaces protrude toward the + side in the Z direction more than first receiver part 225c and second receiver part 225d.

Note that, swing guide member 245 is not limited to a sphere, and may be, for example, a hemisphere, a cylinder, or a half cylinder. Further, swing guide member 245 may be integrated with first base 22. That is, the swing guide member may be configured by a part of first base 22.

Swing Support Spring

Figure 7:
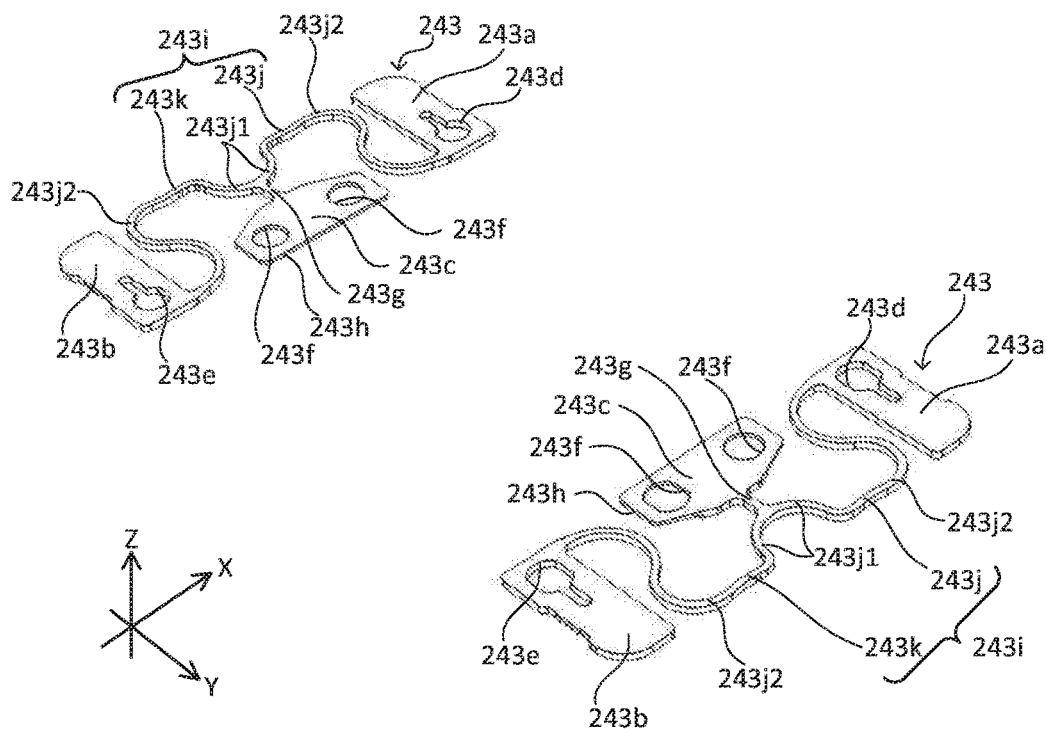
FIG. 7 is a perspective view of only swing support springs.

The pair of swing support springs 243 will be described with reference to FIG. 7. The pair of swing support springs 243 supports holder 241 to be described later to be swingable with respect to first base 22. Each of the pair of swing support springs 243 is a plate spring made of a metal and is arranged on the + side in the Z direction of the pair of swing guide members 245.

Hereinafter, swing support spring 243 that is one (that is, on the + side in the Y direction) of the pair of swing support springs 243 will be described. Support spring 243 that is the other (that is, on the − side in the Y direction) of the pair is symmetrical with swing support spring 243 that is the one of the pair, in the Y direction.

Swing support spring 243 that is the one of the pair includes a pair of first locking parts 243a and 243b, second locking part 243c, twist allowing part 243g, and spring-side guide surface 243h.

First locking part 243a, which is one (that is, on the + side in the Y direction) of the pair of first locking parts 243a and 243b, is arranged in the end part on the + side in the X direction of swing support spring 243 that is the one of the pair. First locking part 243a as such, which is the one of the pair, includes first through-hole 243d.

On the other hand, first locking part 243b, which is the other (that is, on the − side in the X direction) of the pair, is arranged in the end part on the − side in the X direction of swing support spring 243 that is the one of the pair. First locking part 243b as such, which is the other of the pair, includes first-through hole 243e. The pair of first locking parts 243a and 243b is connected with each other by continuous part 243i extending in the X direction.

Continuous part 243i includes continuous part element 243j arranged on the + side in the X direction with respect to twist allowing part 243g to be described later and continuous part element 243k arranged on the − side in the X direction with respect to twist allowing part 243g. Continuous part element 243j connects twist allowing part 243g and first locking part 243a. On the other hand, continuous part element 243k connects twist allowing part 243g and first locking part 243b.

Hereinafter, continuous part element 243j will be described. Continuous part element 243j includes base end-side continuous part 243j1 and meandering continuous part 243j2. Base end-side continuous part 243j1 and meandering continuous part 243j2 are continuous.

In continuous part element 243j, base end-side continuous part 243j1 is provided in an end part on a side close to twist allowing part 243g. One end (an end part on a side close to twist allowing part 243g) of base end-side continuous part 243j1 is continuous with twist allowing part 243g. Meandering continuous part 243j2 has a substantially S shape.

One end (an end part on a side close to twist allowing part 243g) of meandering continuous part 243j2 is continuous with base end-side continuous part 243j1. The other end (an end part on a side far from twist allowing part 243g) of meandering continuous part 243j2 is continuous with first locking part 243a. Continuous part element 243k is symmetrical with continuous part element 243j in the X direction. For this reason, the same reference numerals as those of the constituent members of continuous part element 243j are used for continuous part element 243k, and descriptions thereof are omitted.

Surfaces on the − side in the Z direction of the pair of first locking parts 243a and 243b are bonded and fixed to an end surface on the + side in the Z direction of first side wall part 224a of first base 22. In this state, first positioning protrusion 226 of first base 22 is inserted through first through-hole 243d, and second positioning protrusion 227 of first base 22 is inserted through first through-hole 243e (see FIG. 5).

Note that, in the case of swing support spring 243 that is the other (on the − side in the Y direction) of the pair, the surfaces on the − side in the Z direction of the pair of first locking parts 243a and 243b are bonded and fixed to an end surface on the + side in the Z direction of first side wall part 224b of first base 22.

Second locking part 243c is provided in a portion between first locking parts 243a and 243b in the X direction via gaps therebetween in the X direction. Second locking part 243c includes a pair of second through-holes 243f.

A surface on the + side in the Z direction of second locking part 243c is bonded and fixed to spring seat surfaces (not illustrated) formed on rear surfaces of overhang parts 241q and 241r of holder 241 to be described later. In this state, a pair of holder-side positioning protrusions (not illustrated) formed on the rear surfaces of overhang parts 241q and 241r of holder 241 is inserted through the pair of second through-holes 243f, respectively. Note that, in the case of swing support spring 243 that is the other (on the − side in the Y direction) of the pair, the surface on the + side in the Z direction of second locking part 243c is bonded and fixed to the spring seat surfaces (not illustrated) formed on the rear surfaces of overhang parts 241q and 241r of holder 241.

Twist allowing part 243g is a plate-like member extending in the Y direction, and connects an intermediate part (specifically, one end of each base end-side continuous part 243j1) in the X direction of continuous part 243i and second locking part 243c. By being twisted, twist allowing part 243g as such allows second locking part 243c to twist with respect to first locking parts 243a and 243b.

Further, twist allowing part 243g allows relative displacement in the Z direction between each of first locking parts 243a and 243b and second locking part 243c by elastic deformation.

Spring-side guide surface 243h is formed by a rear surface (that is, the surface on the − side in the Z direction) of second locking part 243c. Spring-side guide surface 243h as such is in contact with the swing guide surface of swing guide member 245 described above.

The pair of swing support springs 243 is plate-like members that are entirely flat in a free state (also referred to as non-assembled state). On the other hand, in the assembled state, in the pair of swing support springs 243, second locking part 243c is located on the + side in the Z direction with respect to first locking parts 243a and 243b based on the elastic deformation of twist allowing part 243g.

Specifically, in the assembled state, twist allowing part 243g is elastically deformed so as to be directed more toward the + side in the Z direction as twist allowing part 243g is directed more toward second locking part 243c. Based on such elastic deformation, spring-side guide surfaces 243h of the pair of swing support springs 243 urge swing guide member 245 toward the − side in the Z direction.

In the assembled state of the pair of swing support springs 243 as described above, base end-side continuous parts 243j1 of the pair of swing support springs 243 are arranged in spring positioning spaces 224e1 and 224e2 and spring positioning spaces 224f1 and 224f2, respectively. Further, damping members 27 that are gel-like are arranged in spring positioning spaces 224e1 and 224e2 and spring positioning spaces 224f1 and 224f2 so as to cover base end-side continuous parts 243j1 (see FIGS. 5, 6 and 7).

Damping member 27 is effective in suppressing resonance of the pair of swing support springs 243. From the viewpoint of suppressing resonance, damping member 27 is preferably provided near a portion, which deforms the most during use, of the pair of swing support springs 243. The portion that deforms the most during use is twist allowing part 243g. For this reason, damping members 27 preferably cover portions, which are close to twist allowing parts 243g, of the pair of swing support springs 243.

Holder

Holder 241 will be described with reference to FIGS. 4 and 8. Holder 241 is made of, for example, a synthetic resin and holds prism 23 in a state of being swingable with respect to first base 22.

Holder 241 includes mounting surface 241a, a pair of opposing wall parts 241f and 241g, and a pair of overhang parts 241q and 241r.

Mounting surface 241a faces the rear side (the − side in the Z direction) of optical path bending surface 231 of prism 23. Mounting surface 241a includes, for example, a surface parallel to optical path bending surface 231. Note that, the structure of mounting surface 241a is not limited to that of the present embodiment, and mounting surface 241a may be a boss having a shape that enables positioning of prism 23, for example.

Each of the pair of opposing wall parts 241f and 241g is a plate-like member parallel to the XZ plane, and is arranged in a state of being separated in the Y direction. The pair of opposing wall parts 241f and 241g as such is arranged to sandwich mounting surface 241a from the Y direction.

The pair of overhang parts 241q and 241r is provided in the pair of opposing wall parts 241f and 241g, respectively. Each of the pair of overhang parts 241q and 241r as such supports holder 241 to be swingable with respect to first base 22.

Specifically, overhang part 241q, which is one (that is, on the + side in the Y direction) of the pair, overhangs on the + side surface in the Y direction of opposing wall part 241f from the side surface to the + side in the Y direction.

On the other hand, overhang part 241r, which is the other (that is, on the − side in the Y direction) of the pair, overhangs on the − side surface in the Y direction of opposing wall part 241g from the side surface to the − side in the Y direction. Further, each of the pair of overhang parts 241q and 241r includes a spring seat surface (not illustrated) that is flat on the rear surface (that is, the surface on the − side in the Z direction). The spring seat surface includes a pair of holder-side positioning protrusions (not illustrated) protruding on the − side in the Z direction at two points separated in the X direction.

Surfaces on the + side in the Z direction of second locking parts 243c of the pair of swing support springs 243 are bonded and fixed to each spring seat surface. In this state, the pair of holder-side positioning protrusions is inserted through the pair of second through-holes 243f of swing support spring 243, respectively. With this structure, holder 241 is supported to be swingable with respect to first base 22.

Note that, outer end parts in the Y direction of overhang parts 241q and 241r of holder 241 are located on a center side in the Y direction with respect to the both end surfaces in the Y direction of first base 22. Such a configuration contributes to a reduction in the size and weight of holder 241.

First Actuator

First actuator 244 that is an optical path bending member driving actuator will be described with reference to FIGS. 5 and 8. First actuator 244 swings holder 241 about the first axis. The first axis is an axis parallel to the Y direction. Specifically, the first axis is an axis parallel to the Y axis that passes through contact parts between the swing guide surfaces of the pair of swing guide members 245 and spring-side guide surfaces 243h of the pair of swing support springs 243.

First actuator 244 is arranged on the rear sides (that is, on the − side in the Z direction) of prism 23 and holder 241 so as to overlap optical path bending surface 231 of prism 23 and holder 241 in the Z direction (that is, the direction of the first optical axis). First actuator 244 includes first magnet 244a, first coil 244c, and first Hall element 244e.

First magnet 244a is fixed to a rear side surface (that is, the surface on the − side in the Z direction) of holder 241 that is a movable-side member. First magnet 244a is composed of two magnet elements adjacent in the X direction. These respective magnet elements are magnetized in the Z direction and include one magnetic pole on one side. The directions of the magnetic poles of the respective magnet elements are opposite to each other.

First coil 244c and first Hall element 244e are fixed to the front surface (that is, the surface on the + side in the Z direction) of flexible printed circuit board (hereinafter, referred to as FPC) 25 fixed to a rear side surface of first base 22.

First coil 244c and first Hall element 244e are arranged in base-side opening 220 of first base 22. Note that, first coil 244c is a so-called air-core coil having an oval shape. First Hall element 244e is arranged on the inner side in the radial direction of first coil 244c.

First actuator 244 having the aforementioned configuration swings holder 241 about the first axis under the control by a camera shake correction control section (not illustrated).

Next, lens module 3 of the camera module according to the present embodiment will be described.

Lens Module

As illustrated in FIGS. 1 and 9 to 17, lens module 3 includes second cover 31, second base 32, lens part 33, AF apparatus 36, second shake correction apparatus 37, and reference member 38.

Second Cover

Figure 17:
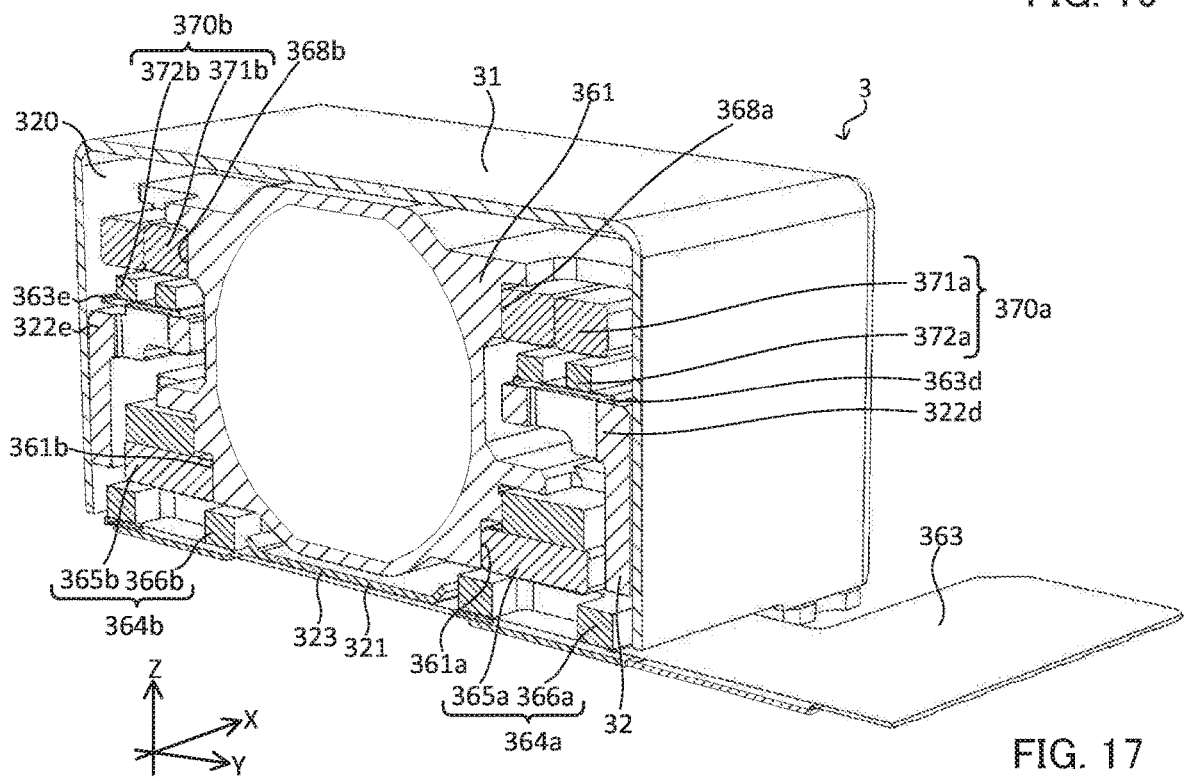
FIG. 17 is a cross-sectional view of the lens module.
Figure 18:
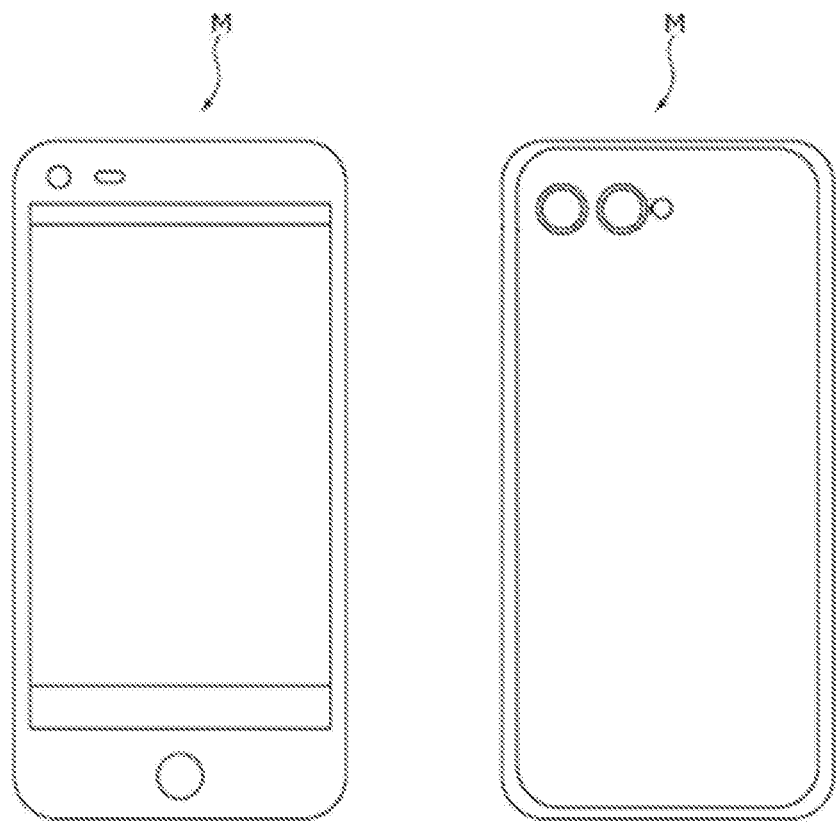
FIG. 18 is a diagram illustrating an example of a camera-mounted apparatus on which the camera module is mounted.

Second cover 31 will be described with reference to FIGS. 1 and 17. Second cover 31 is a box-shaped member that is made of, for example, a synthetic resin or a nonmagnetic metal, and is open on the both sides in the X direction and on the − side (that is, the rear side) in the Z direction. Second cover 31 as described above is combined with second base 32 to be described later from the + side in the Z direction.

Second Base

Second base 32 will be described with reference to FIGS. 9 to 12, 16 and 17. Second base 32 is combined with second cover 31 described above, thereby forming second accommodation space 320 in which lens part 33, AF apparatus 36, and second shake correction apparatus 37 can be arranged.

Second base 32 includes bottom part 321 and a pair of second side wall parts 322a and 322b. Bottom part 321 includes a base made of a synthetic resin and reinforcing plate 323 made of a metal and insert-molded on the base. Reinforcing plate 323 as such contributes to an increase in the rigidity of bottom part 321 and a decrease in the thickness of bottom part 321.

Reinforcing plate 323 of second base 32 is arranged on the − side in the Z direction with respect to lens guide 361 to be described later so as to overlap lens guide 361. Specifically, at whichever position lens guide 361 is present in a movable range (that is, a range of being movable in the X direction) during autofocus operation and in a movable range (that is, a range of being movable in the Y direction) during shake correction operation, lens guide 361 is configured to be present on the + side in Z direction of reinforcing plate 323. For this reason, the front surface (that is, the surface on the + side in the Z direction) of reinforcing plate 323 is always covered with lens guide 361 and not exposed. Accordingly, reflected light by reinforcing plate 323 is prevented from entering lens part 33 and eventually an imaging element of imaging element module 4 to be described later.

Second base 32 includes bottom through-holes 321a and 321b (see FIG. 16) on respective both side parts in the Y direction of reinforcing plate 323 in bottom part 321. AF coils 366a and 366b of a pair of AF actuators 364a and 364b to be described later are arranged in bottom through-holes 321a and 321b.

Each of second side wall parts 322a and 322b extends from both end parts in the Y direction of bottom part 321 to the + side in the Z direction. Each of second side wall parts 322a and 322b includes coil mount parts 322d and 322e. On coil mount parts 322d and 322e as such, second coils 372a and 372b of second shake correction apparatus 37 to be described later are placed, respectively.

Further, AF magnets 365a and 365b of the pair of AF actuators 364a and 364b to be described later are arranged between a pair of coil mount parts 322d and 322e and bottom part 321.

In the case of the present embodiment, bottom through-holes 321a and 321b and coil mount parts 322d and 322e overlap with each other in the Z direction with a prescribed gap therebetween. Accordingly, AF coils 366a and 366b to be arranged in bottom through-holes 321a and 321b and second coils 372a and 372b to be mounted on coil mount parts 322d and 322e overlap with each other in the Z direction with a prescribed gap therebetween.

Further, second side wall part 322a includes spring positioning parts 324a and 324c (see FIG. 9) for positioning springs 362a and 362c to be described later in both end parts in the X direction on the side surface on the + side in the Y direction. On the other hand, second side wall part 322b includes spring positioning parts 324b and 324d (see FIG. 10) for positioning springs 362b and 362d to be described later in both end parts in the X direction on the side surface on the − side in the Y direction.

Second side wall part 322a includes slit 322i (see FIG. 9) on the side surface on the + side in the Y direction. Slit 322i includes a space in which first continuous part 363i of FPC 363 (see FIG. 13) to be described later can be arranged. The space is a space parallel to the ZY plane. Slit 322i opens on the + side in the Y direction and on the both sides in the Z direction.

Second side wall part 322b of second base 32 includes a pair of recesses 322j on the side surface on the − side in the Y direction. A pair of second continuous parts 363j of FPC 363 to be described later is arranged in recesses 322j, respectively. Note that, the configuration of recess 322j is not limited to that illustrated.

Each of spring positioning parts 324a to 324d includes gel positioning parts 324e to 324h in end parts on the + side in the Z direction. Each of gel positioning parts 324e to 324h is configured to be capable of holding damping members 81a to 81d that are gel-like and cover portions of springs 362a to 362d. Each of gel positioning parts 324e to 324h as such includes a pair of holding surfaces 324i1 and 324i2 facing each other in the X direction.

Lens Part

Lens part 33 is arranged in second accommodation space 320 in a state in which lens part 33 is held by lens guide 361 to be described later. Lens part 33 as such includes a cylindrical lens barrel and one or more lenses held by the lens barrel. As an example, lens part 33 includes a 3× or more optical telephoto lens group, for example, which is fixed between the end part on the − side in the X direction of the lens barrel and the end part on the + side in the X direction of the lens barrel. Note that, the structure of lens part 33 is not limited to the aforementioned structure.

AF Apparatus

AF apparatus 36 will be described with reference to FIGS. 9 to 14 and 17. AF apparatus 36 displaces lens part 33 in the X direction for the purpose of autofocusing. Specifically, AF apparatus 36 includes lens guide 361, a plurality (four in the case of the present embodiment) of springs 362a to 362d, FPC 363, and the pair of AF actuators 364a and 364b.

Lens Guide

Lens guide 361 includes an accommodation space in which the lens barrel can be held. Lens guide 361 as such is arranged in second accommodation space 320 described above in a state in which displacement in the X direction (that is, the direction of the second optical axis) and the Y direction is possible.

Figure 11:
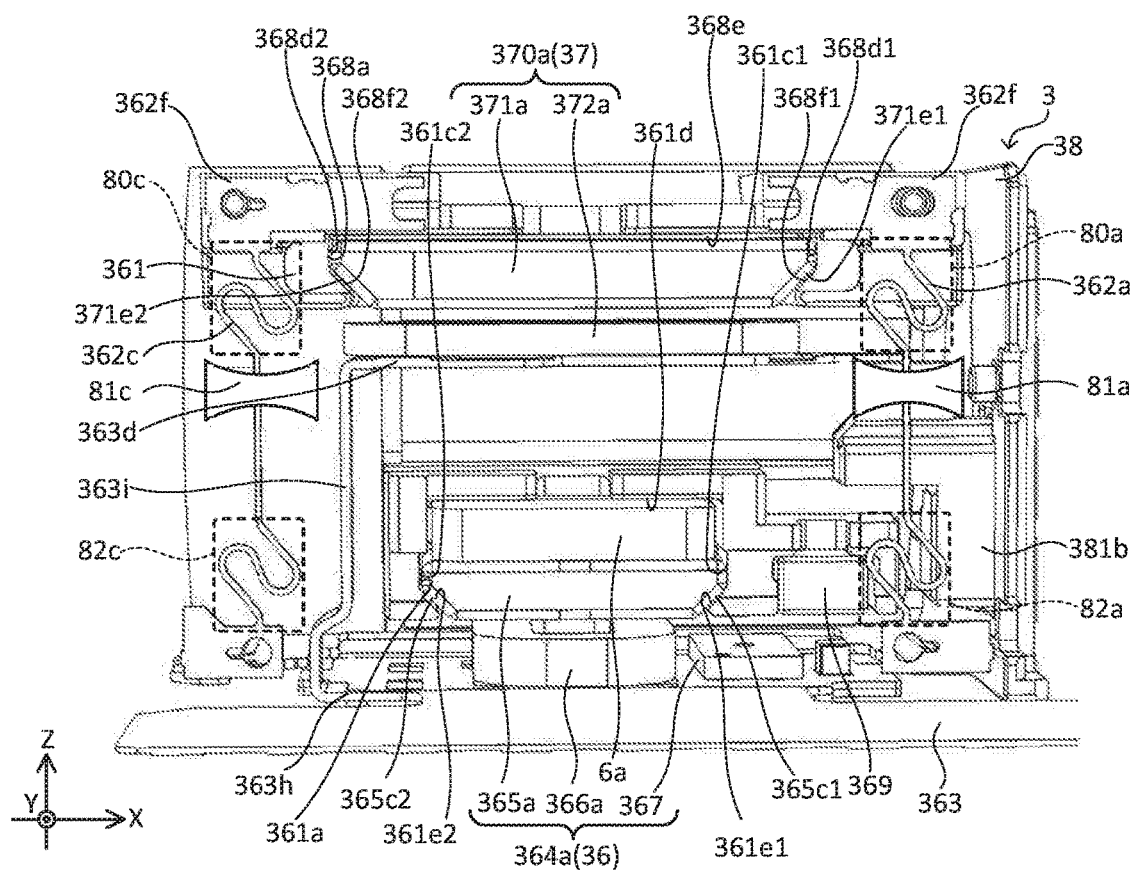
FIG. 11 is a side view of the lens module from which a second base is omitted.
Figure 12:
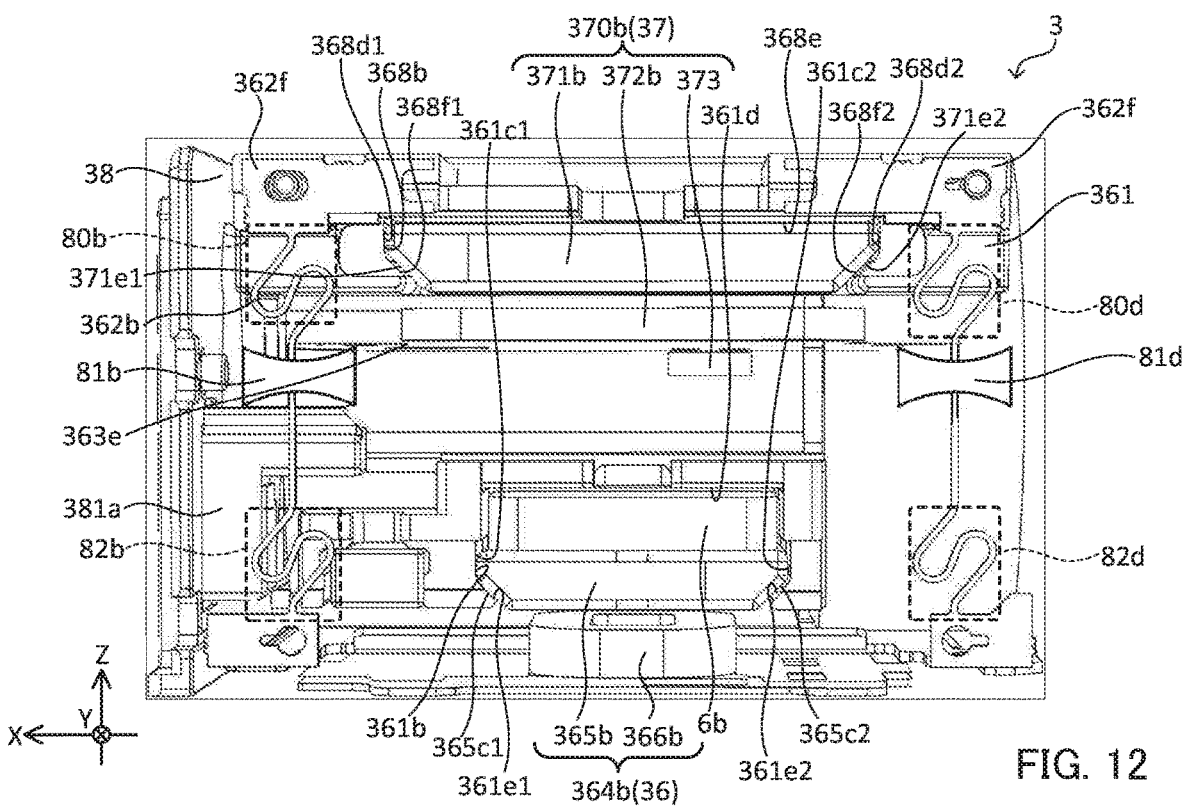
FIG. 12 is a side view of the lens module from which the second base is omitted, in a state in which the lens module is viewed from a side opposite to that in FIG. 11.

Lens guide 361 includes a pair of first magnet holding parts 361a and 361b that holds AF magnets 365a and 365b of the pair of AF actuators 364a and 364b to be described later. Each of the pair of first magnet holding parts 361a and 361b is arranged on the − side in the Z direction of the pair of coil mount parts 322d and 322e of second base 32. Note that, FIG. 11 is a side view of lens module 3 in a state in which some members are omitted from lens module 3, viewed from the + side in the Y direction. On the other hand, FIG. 12 is a side view of lens module 3 in a state in which some members are omitted from lens module 3, viewed from the − side in the Y direction.

In the case of the present embodiment, each of the pair of first magnet holding parts 361a and 361b is a recess that is open on the − side in the Z direction. Each of the pair of first magnet holding parts 361a and 361b as such includes inclined surface parts 361e1 and 361e2 facing chamfered parts 365c1 and 365c2 of AF magnets 365a and 365b, in a state in which AF magnets 365a and 365b are held.

Specifically, each of the pair of first magnet holding parts 361a and 361b includes a pair of side surface parts 361c1 and 361c2 separated in the X direction and facing each other in the X direction. Each of the pair of first magnet holding parts 361a and 361b includes upper surface part 361d that connects end parts on the + side in the Z direction of the pair of side surface parts 361c1 and 361c2, in the X direction. Note that, upper surface part 361d may partially include a discontinuous portion such as a through-hole and a notch.

Further, each of the pair of side surface parts 361c1 and 361c2 includes inclined surface parts 361e1 and 361e2 described above in end parts on the − side in the Z direction. Inclined surface parts 361e1 and 361e2 are inclined surfaces along chamfered parts 365c1 and 365c2 of AF magnets 365a and 365b.

Specifically, inclined surface part 361e1 and inclined surface part 361e2 are inclined in a direction in which the distance therebetween in the X direction decreases toward the − side in the Z direction (the lower side in FIGS. 11 and 12). That is, the distance in the X direction between inclined surface part 361e1 and inclined surface part 361e2 is the smallest in end parts on the − side in the Z direction. Inclined surface parts 361e1 and 361e2 as such contribute to preventing AF magnets 365a and 365b from coming off on the − side in the Z direction in the assembled state.

Lens guide 361 includes a pair of second magnet holding parts 368a and 368b (see FIGS. 11 and 12) that hold second magnets 371a and 371b of a pair of second actuators 370a and 370b to be described later. Each of the pair of second magnet holding parts 368a and 368b overlaps with coil mount parts 322d and 322e of second base 32 in the Z direction with a prescribed gap therebetween.

Each of the pair of second magnet holding parts 368a and 368b is a recess that is open on the − side in the Z direction. Each of the pair of second magnet holding parts 368a and 368b as such includes inclined surface parts 368f1 and 368f2 facing chamfered parts 371e1 and 371e2 of second magnets 371a and 371b, in a state in which second magnets 371a and 371b are held.

Specifically, each of the pair of second magnet holding parts 368a and 368b includes a pair of side surface parts 368d1 and 368d2 separated in the X direction and facing each other in the X direction. Further, each of the pair of second magnet holding parts 368a and 368b includes upper surface part 368e that connects end parts on the + side in the Z direction of the pair of side surface parts 368d1 and 368d2, in the X direction. Note that, upper surface part 368e may partially include a discontinuous portion such as a through-hole and a notch.

Further, each of the pair of side surface parts 368d1 and 368d2 includes inclined surface parts 368f1 and 368f2 described above in end parts on the − side in the Z direction. Inclined surface parts 368f1 and 368f2 are inclined surfaces along chamfered parts 371e1 and 371e2 of second magnets 371a and 371b.

Specifically, inclined surface part 368f1 and inclined surface part 368f2 are inclined in a direction in which the distance therebetween in the X direction decreases toward the − side in the Z direction. That is, the distance in the X direction between inclined surface part 368f1 and inclined surface part 368f2 is the smallest in end parts on the − side in the Z direction. Inclined surface parts 368f1 and 368f2 as such contribute to preventing second magnets 371a and 371b from coming off on the − side in the Z direction in the assembled state.

Spring

A plurality (four in the case of the present embodiment) of springs 362a to 362d that are elastic support members will be described with reference to FIGS. 9 to 12 and 14. Springs 362a to 362d elastically support lens guide 361 on second base 32. In this state, lens part 33 can be displaced in the X direction and the Y direction with respect to second base 32.

Figure 9:
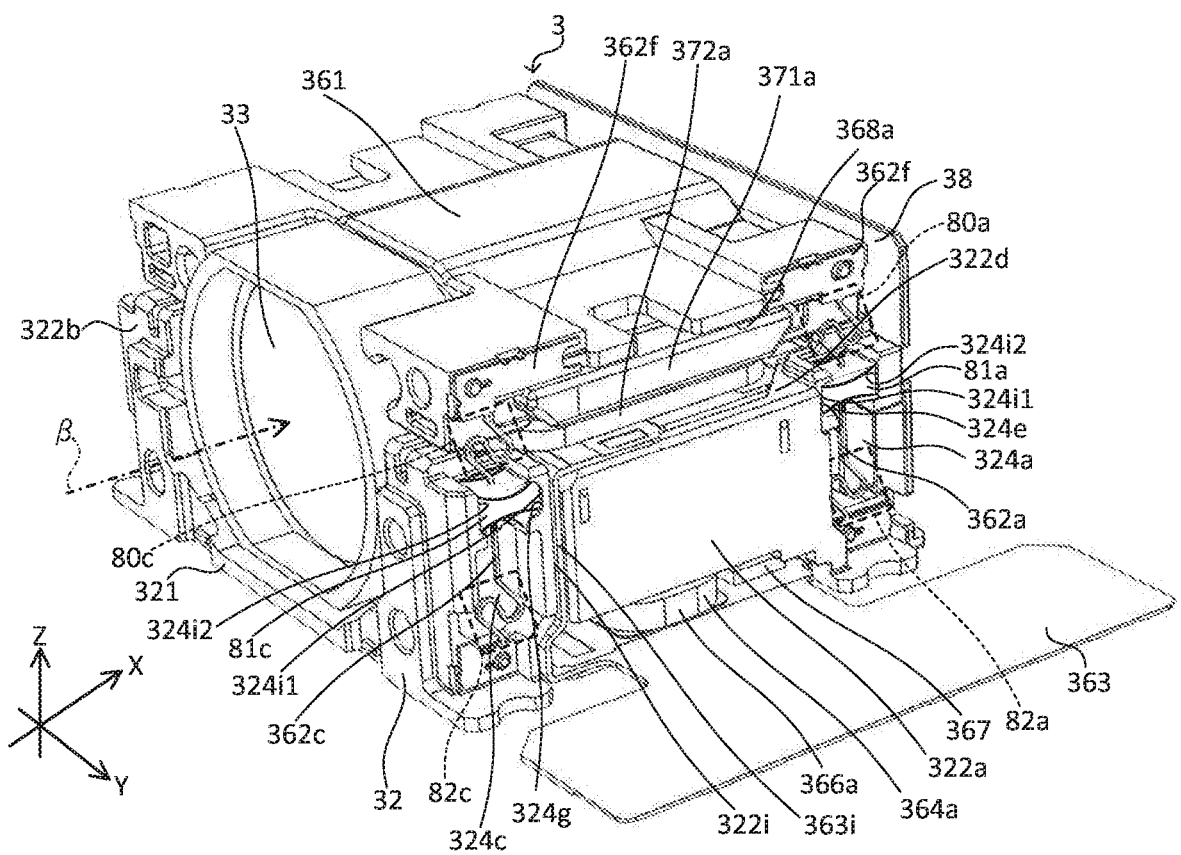
FIG. 9 is a perspective view of a lens module from which some members are omitted.

In the case of the present embodiment, spring 362a supports end parts on the + side in the X direction and on the + side in the Y direction of lens guide 361 on second base 32 (see FIG. 9). Spring 362b supports end parts on the + side in the X direction and on the − side in the Y direction of lens guide 361 on second base 32 (see FIG. 10). Spring 362c supports end parts on the − side in the X direction and on the + side in the Y direction of lens guide 361 on second base 32 (see FIG. 9). Furthermore, spring 362d supports end parts on the − side in the X direction and on the − side in the Y direction of lens guide 361 on second base 32 (see FIG. 10).

Figure 14:
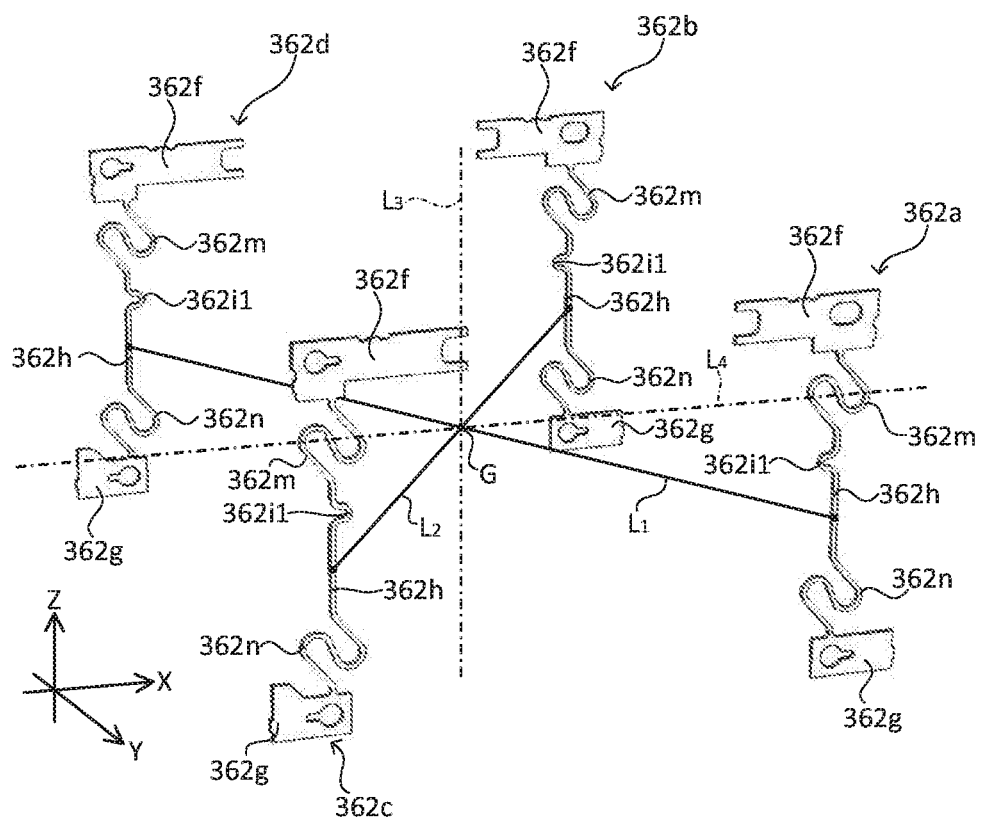
FIG. 14 is a perspective view of only springs as being arranged in an assembled state.

As illustrated in FIG. 14, each of springs 362a to 362d includes first fixed part 362f, second fixed part 362g, and connection part 362h. Note that, FIG. 14 illustrates springs 362a to 362d as arranged in the assembled state.

First fixed part 362f is fixed to lens guide 361 that is a movable-side member. Second fixed part 362g is fixed to second base 32 that is a fixed-side member.

Connection part 362h connects first fixed part 362f and second fixed part 362g together. Connection part 362h is composed of, for example, a linear member that is at least partially curved (specifically, bent into a meandering shape and molded).

Specifically, each connection part 362h of springs 362a to 362d includes first bending part 362m, gel locking part 362i1, and second bending part 362n in this order from the + side in the Z direction. Each of springs 362a to 362d as such is arranged in spring positioning parts 324a to 324d (see FIGS. 9 and 10) of second base 32 in the assembled state.

First bending part 362m is a portion bent in a meandering shape, and is provided in one end part (the end part on the + side in the Z direction) of connection part 362h. First bending part 362m as such elastically deforms in the length direction (the Z direction) of connection part 362h when lens part 33 is displaced in the Z direction with respect to second base 32.

Note that, the position of first bending part 362m is not limited to the position of the present embodiment. First bending part 362m is preferably provided in a half part on one side (that is, a half part on a side of first fixed part 362f) of connection part 362h. Further, first bending part 362m is more preferably provided in one end part of connection part 362h as in the present embodiment.

In the assembled state, each first bending part 362m is covered by damping member 80a, 80b, 80c and 80d that are first damping members and gel-like. For convenience of description, damping members 80a, 80b, 80c and 80d are indicated by dashed lines in FIGS. 9 to 12. In the case of the present embodiment, damping members 80a to 80d are provided so as to cover parts of first bending parts 362m and first fixed parts 362f. However, damping members 80a to 80d may be provided so as to cover first bending parts 362m without covering first fixed parts 362f. First bending part 362m has a meandering shape, and is therefore excellent in adhesiveness with damping members 80a to 80d. Note that, damping members 80a to 80d may be omitted.

Gel locking part 362i1 is formed by a curved part that is curved so as to protrude in a prescribed direction (for example, the X direction) from a straight part of connection part 362h. Gel locking parts 362i1 in springs 362a and 362b protrude on the − side in the X direction from the straight parts of connection parts 362h. On the other hand, gel locking parts 362i1 in springs 362c and 362d protrude on the + side in the X direction from the straight parts of connection parts 362h. That is, gel locking parts 362i1 in springs 362a and 362b and gel locking parts 362i1 in springs 362c and 362d protrude in opposite directions in the X direction from the straight parts of connection parts 362h.

In the assembled state, each gel locking part 362i1 is arranged in gel positioning parts 324e to 324h in spring positioning parts 324a to 324d of second base 32. Gel locking part 362i1 as such is a portion (also referred to as maximum displacement portion) that is displaced most in the X direction in connection part 362h when lens guide 361 is displaced in the X direction by the autofocus function.

Each gel locking part 362i1 as such is covered by damping member 81a, 81b, 81c and 81d (see FIGS. 9 and 10) that are third damping members. In the case of the present embodiment, each of damping members 81a to 81d has a scallop shape. Specifically, each of damping members 81a to 81d extends in one direction (the X direction), and becomes thinner from the both end parts toward the center part in the one direction. The both end parts of damping members 81a to 81d are attached to holding surfaces 324i1 and 324i2 of gel positioning parts 324e to 324h, respectively. The center parts of damping members 81a to 81d are attached to gel locking parts 362i1. That is, each of damping members 81a to 81d is provided so as to be spanned between connection parts 362h (specifically, gel locking parts 362i1) of springs 362a to 362d and spring positioning parts 324a to 324d (specifically, gel positioning parts 324e to 324h) of second base 32.

In the case of the present embodiment, each of damping members 81a to 81d is provided so as to fill prescribed ranges (that is, parts) of gel positioning parts 324e to 324h. In other words, in the case of the present embodiment, the volume of each of damping members 81a to 81d with respect to the capacity of gel positioning parts 324e to 324h is suppressed to a prescribed range. Such a configuration contributes to preventing gain decrease in the control of autofocusing or shake correction. On the other hand, when damping members 81a to 81d are provided so as to fill the whole of gel positioning parts 324e to 324h, the damping effect by damping members 81a to 81d becomes too effective so that the gain in the control of autofocusing or shake correction may decrease. Note that, damping members 81a to 81d may be omitted.

Figure 15A:
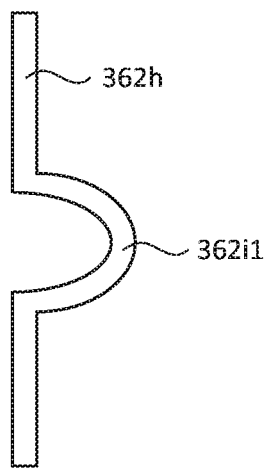
FIG. 15A is a schematic diagram of a gel locking part of a spring.
Figure 15B:
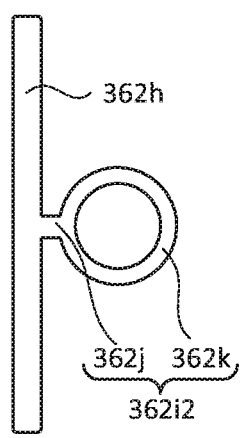
FIG. 15B is a schematic diagram of Modification 1 of the gel locking part.

The shape of gel locking part 362i1 is not limited to that in the case of the present embodiment. Gel locking part 362i2 illustrated in FIG. 15B is a modification of gel locking part 362i1. Gel locking part 362i2 includes continuous part 362j and annular part 362k.

Figure 15C:
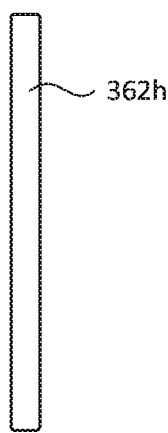
FIG. 15C is a schematic diagram of Modification 2 of the gel locking part.

Continuous part 362j extends linearly in a prescribed direction (for example, the X direction) from the straight part of connection part 362h. Annular part 362k is annular and continues to a distal end part of continuous part 362j. Continuous part 362j may not be linear. In the case illustrated in the drawing, continuous parts 362j in springs 362a and 362b extend on the − side in the X direction from the straight parts of connection parts 362h. On the other hand, continuous parts 362j in springs 362c and 362d extend on the + side in the X direction from the straight parts of connection parts 362h. For example, continuous part 362j may have a meandering shape. Further, the shape of annular part 362k is not limited to that illustrated. For example, the shape of annular part 362k may be circular, elliptical, or polygonal. Note that, as illustrated in FIG. 15C, gel locking part 362i2 may be omitted.

Second bending part 362n is a linear member that is provided in the other end part (the end part on the − side in the Z direction) of connection part 362h and is bent in a meandering shape. Second bending part 362n elastically deforms in the length direction (the Z direction) of connection part 362h when lens part 33 is displaced in the Z direction with respect to second base 32. Second bending part 362n as such is not displaced as much as first bending part 362m when lens part 33 is displaced in the Z direction with respect to second base 32.

Further, when lens part 33 is displaced in the X direction with respect to second base 32, connection part 362h is displaced so as to swing, with the vicinity of an end part on a side of second fixed part 362g being as a fulcrum. Accordingly, the farther a portion of connection part 362h is from the fulcrum (in other words, the closer a portion of connection part 362h is to first fixed part 362f), the greater the amount of displacement is when lens part 33 is displaced in the X direction with respect to second base 32.

Note that, the position of second bending part 362n is not limited to the position of the present embodiment. Second bending part 362n is preferably provided in a half part on the other side (that is, a half part on the side of second fixed part 362g) of connection part 362h. Further, second bending part 362n is more preferably provided in the other end part of connection part 362h as in the present embodiment. Further, in the present embodiment, second bending part 362n may be omitted. That is, connection part 362h may be configured to include a bending part at only one point.

In the assembled state, each second bending part 362n is covered by damping members 82a, 82b, 82c and 82d that are second damping members and gel-like. For convenience of description, each of damping members 82a, 82b, 82c and 82d is indicated by dashed lines in FIGS. 9 to 12. In the case of the present embodiment, damping members 82a to 82d are provided so as to cover parts of second bending parts 362n and second fixed parts 362g. However, damping members 82a to 82d may be provided so as to cover second bending parts 362n without covering second fixed parts 362g. Second bending part 362n has a meandering shape, and is therefore excellent in adhesiveness with damping members 82a to 82d. Note that, damping members 82a to 82d may be omitted.

As described above, in the case of the present embodiment, damping members 80a to 80d, damping members 81a to 81d, and damping members 82a to 82d in this order from a side closer to first fixed part 362f are provided at three points of springs 362a to 362d. However, the number and positions of the damping members are not limited in the case of the present embodiment.

For example, the damping members may be provided only at one point of springs 362a to 362d. Specifically, in the present embodiment, damping members 80a to 80d may be configured to be provided only in first bending parts 362m. Alternatively, in the present embodiment, damping members 81a to 81d may be configured to be provided only in gel locking parts 362i1. Alternatively, in the present embodiment, damping members 82a to 82d may be configured to be provided only in second bending parts 362n. In this case, the damping member provided at one point of springs 362a to 362d serves as the first damping member. Note that, the positions at which the damping members are provided may be changed for each of springs 362a to 362d.

Further, the damping members may be provided only at two points of springs 362a to 362d. Specifically, in the present embodiment, damping members 80a to 80d may be configured to be provided in first bending parts 362m and damping members 82a to 82d may be configured to be provided in second bending parts 362n. Alternatively, in the present embodiment, damping members 80a to 80d may be configured to be provided in first bending parts 362m and damping members 81a to 81d may be configured to be provided in gel locking parts 362i1. In this case, one of the damping members provided at two point of springs 362a to 362d is the first damping member, and the other is the second damping member.

In the case of the present embodiment, connection part 362h has directionality in the X direction. Springs 362a and 362b are arranged so as to be in the same direction in the X direction. In other words, spring 362a and spring 362b are arranged such that at least connection parts 362h overlap when viewed from the + side in the Y direction, for example.

Springs 362c and 362d are arranged so as to be in the same direction in the X direction. In other words, spring 362c and spring 362d are arranged so that at least connection parts 362h overlap when viewed from the + side in the Y direction, for example.

Spring 362a and spring 362c are arranged such that only gel locking parts 362i1 of connection parts 362h face in opposite directions in the X direction. That is, spring 362a and spring 362c are arranged such that the portions other than gel locking parts 362i1 of connection parts 362h face in the same direction in the X direction.

Spring 362b and spring 362d are arranged such that only gel locking parts 362i1 of connection parts 362h face in opposite directions in the X direction. That is, spring 362b and spring 362d are arranged such that the portions other than gel locking parts 362i1 of connection parts 362h face in the same direction in the X direction.

Further, in the case of the present embodiment, for example, when a line segment connecting the center of spring 362a and the center of spring 362d that are arranged at diagonal positions of lens guide 361 when viewed from the + side in the Z direction is $L_1$ and a line segment connecting the center of spring 362b and the center of spring 362c is $L_2$ as illustrated in FIG. 14, the intersection of $L_1$ and $L_2$ (also referred to as center position of dispersed arrangement) coincides or substantially coincides with center of gravity G of a movable part at a reference position to be described later.

Note that, the movable part is lens guide 361 and each member that is fixed to lens guide 361 and is displaceable together with lens guide 361. Specifically, in the case of the present embodiment, the movable part includes e.g. lens guide 361, lens part 33, AF magnets 365*a* and 365*b* of the pair of AF actuators 364*a* and 364*b*, and second magnets 371*a* and 371*b* of the pair of second actuators 370*a* and 370*b*.

The center of each spring is, for example, the center position in the Z direction and the center position in the X direction of each spring. Further, the reference position of lens guide 361 refers to a state in which lens guide 361 is not displaced in the X direction by the autofocus function and a state in which lens guide 361 is not displaced in the Y direction by second shake correction apparatus 37 to be described later. Such a configuration reduces resonance of lens guide 361 around straight line $L_3$ passing through the center of gravity of the movable part and parallel to the Z direction.

Note that, each of springs 362*a* to 362*d* as described above is arranged in the following manner. When a straight line passing through center of gravity G and parallel to the direction of the second optical axis (that is, the X direction) is straight line $L_4$ (see FIG. 14), a pair of springs 362*a* and 362*b* on the + side in the X direction is arranged at two points symmetrical with respect to straight line $L_4$ described above and separated from center of gravity G by prescribed distances on the + side in the X direction (the right side in FIG. 14). On the other hand, a pair of springs 362*c* and 362*d* on the − side in the X direction is arranged at two points symmetrical with respect to straight line $L_4$ described above and separated from center of gravity G by prescribed distances on the − side in the X direction (the left side in FIG. 14). As a result, the intersection of straight line $L_1$ described above and straight line $L_2$ described above coincides with center of gravity G described above.

FPC

Figure 13:
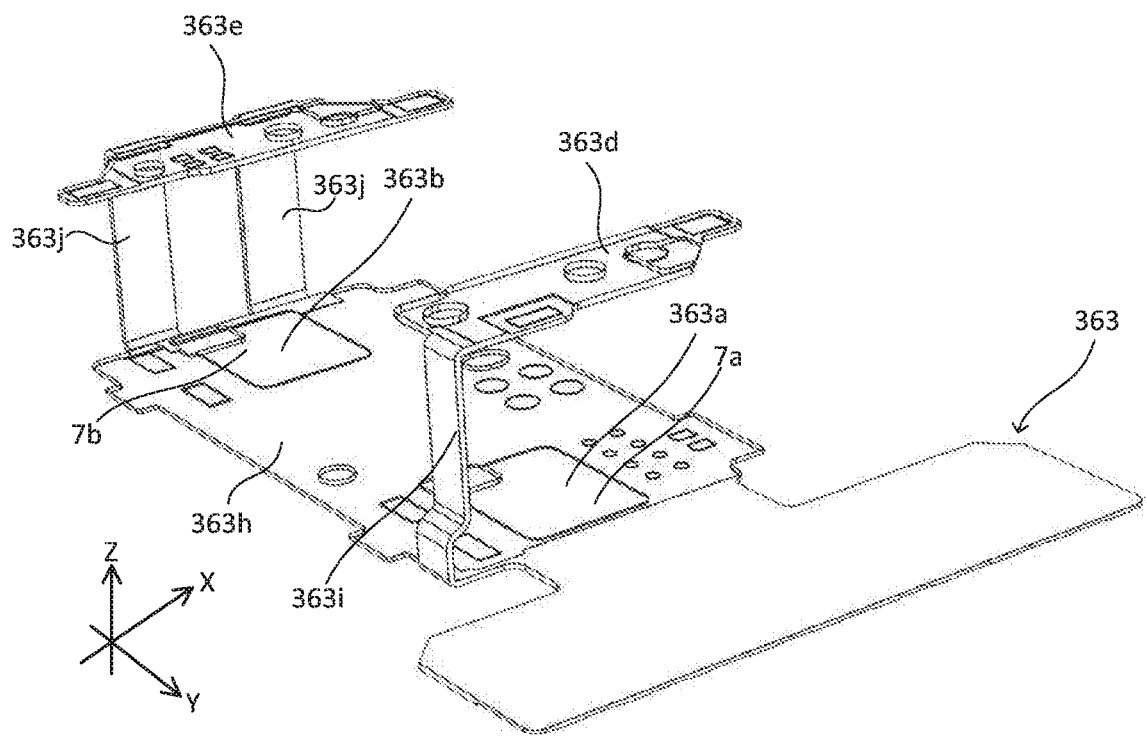
FIG. 13 is a perspective view of only an FPC of the lens module.

FPC 363 will be described with reference to FIG. 13. FPC 363 is a flexible printed circuit board and is fixed to second base 32 (see FIGS. 9 and 10). For example, FPC 363 supplies electric power to AF apparatus 36 to be described later and second actuators 370*a* and 370*b* of second shake correction apparatus 37 to be described later.

Specifically, FPC 363 is a continuous flexible printed circuit board, and includes FPC base 363*h*, a pair of first coil fixed parts 363*a* and 363*b*, and a pair of second coil fixed parts 363*d* and 363*e*.

FPC base 363*h* is a plate-like member extending in the Y direction, and is fixed to bottom part 321 (see FIGS. 9 and 10) of second base 32. AF coil 366*a* (see FIG. 11) of AF apparatus 36 is fixed to first coil fixed part 363*a* via board 7*a*. In this state, first coil fixed part 363*a* and AF coil 366*a* are arranged in bottom through-hole 321*a* (see FIG. 16) of second base 32.

On the other hand, AF coil 366*b* (see FIG. 12) of AF apparatus 36 is fixed to first coil fixed part 363*b* via board 7*b*. In this state, first coil fixed part 363*b* and AF coil 366*b* are arranged in bottom through-hole 321*b* of second base 32.

Second coil fixed parts 363*d* and 363*e* overlap first coil fixed parts 363*a* and 363*b*, respectively, in the Z direction with a prescribed gap therebetween. Second coils 372*a* and 372*b* of second shake correction apparatus 37 to be described later are fixed on the surfaces of second coil fixed parts 363*d* and 363*e*, respectively (see FIGS. 11 and 12). In this state, second coil fixed parts 363*d* and 363*e* are mounted on the surfaces of coil mount parts 322*d* and 322*e* (see FIG. 17) of second base 32, respectively.

Second coil fixed part 363*d* continues to FPC base 363*h* via first continuous part 363*i*. First continuous part 363*i* is a plate-like member parallel to the ZY plane. First continuous part 363*i* is arranged in slit 322*i* (see FIG. 9) formed on a side surface on the + side in the Y direction of second side wall part 322*a* in second base 32.

On the other hand, second coil fixed part 363*e* continues to FPC base 363*h* via second continuous part 363*j*. Second continuous part 363*j* is a plate-like member parallel to the XZ plane. Second continuous part 363*j* is arranged in recess 322*j* (see FIG. 10) of second side wall part 322*b* in second base 32.

AF Actuator

Figure 16:
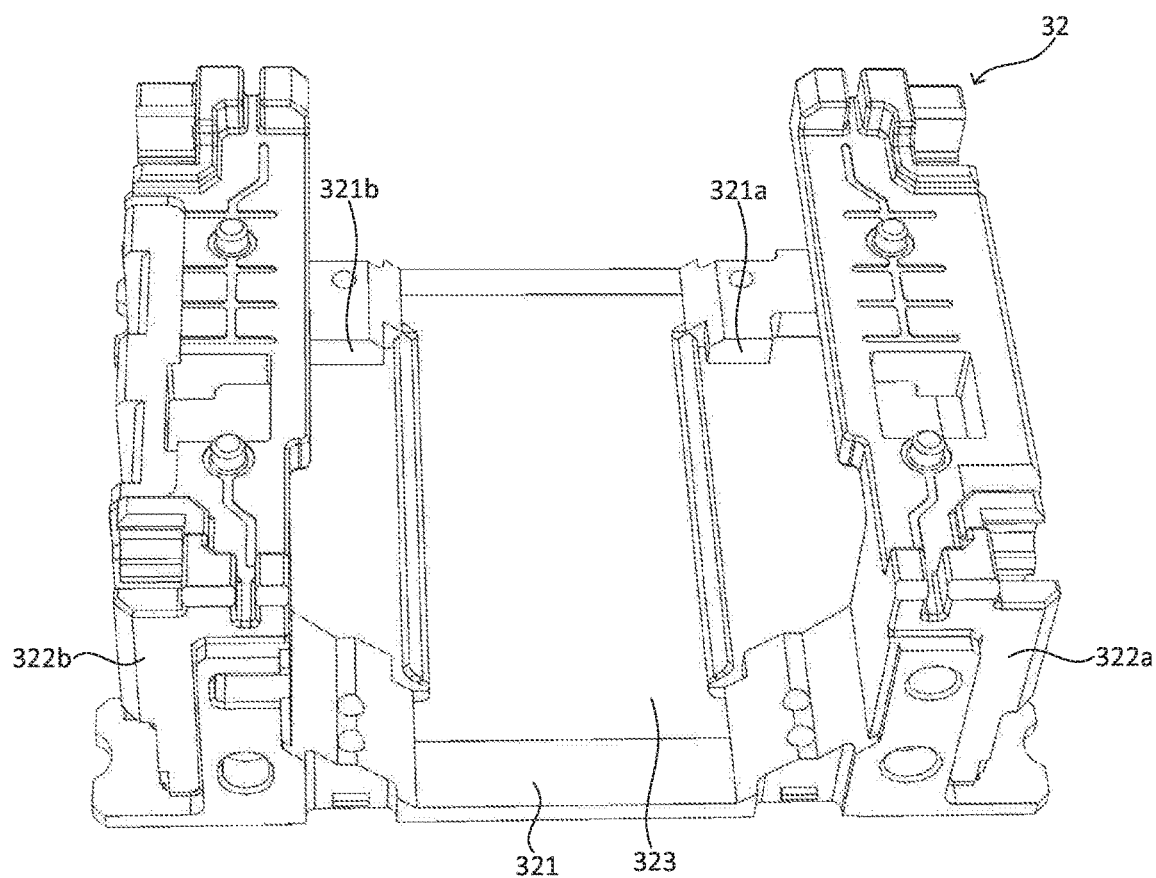
FIG. 16 is a perspective view of the second base.

The pair of AF actuators 364*a* and 364*b* will be described with reference to FIGS. 11, 12 and 16. Each of the pair of AF actuators 364*a* and 364*b* is one actuator of a first lens driving actuator and a second lens driving actuator. AF actuator 364*a* on the + side in the Y direction includes AF magnet 365*a* and AF coil 366*a*. On the other hand, AF actuator 364*b* on the − side in the Y direction includes AF magnet 365*b*, AF coil 366*b*, and Driver IC 367.

Each of AF actuators 364*a* and 364*b* as such is a moving magnet-type actuator in which AF magnet 365*a* or 365*b* is fixed to lens guide 361, which is the movable-side member, and AF coil 366*a* or 366*b* is fixed to second base 32, which is the fixed-side member, via FPC 363.

Note that, AF actuators 364*a* and 364*b* may be moving coil-type actuators. The structure of each component of AF actuators 364*a* and 364*b* as such is substantially the same as a conventionally known structure, and a detailed description thereof is therefore omitted. Hereinafter, the positioning of each component of AF actuators 364*a* and 364*b* will be described.

AF magnets 365*a* and 365*b* are held by first magnet holding parts 361*a* and 361*b* of lens guide 361, respectively. In this state, AF magnets 365*a* and 365*b* are arranged on the + side in the Z direction of the pair of coil mount parts 322*d* and 322*e* (see FIGS. 9 and 10) of second base 32, respectively. In the case of the present embodiment, each of AF magnets 365*a* and 365*b* is magnetized in the Z direction and includes two magnetic poles on one side.

Further, each of AF magnets 365*a* and 365*b* is like a hexagonal column which is long in the X direction and whose shape, viewed from the Y direction (the state illustrated in FIGS. 11 and 12), for example, is substantially hexagonal.

Each of AF magnets 365*a* and 365*b* includes a pair of chamfered parts 365*c*1 and 365*c*2. Each of the pair of chamfered parts 365*c*1 and 365*c*2 is provided on a pair of side surfaces facing each other in the X direction in AF magnets 365*a* and 365*b*. Further, chamfered part 365*c*1 and chamfered part 365*c*2 are inclined in a direction in which the distance therebetween in the X direction decreases toward the − side in the Z direction.

In the assembled state, chamfered part 365*c*1 and chamfered part 365*c*2 as such face inclined surface parts 361*e*1 and 361*e*2 of the pair of first magnet holding parts 361*a* and 361*b* in lens guide 361, respectively.

AF coils 366*a* and 366*b* are a so-called air-core coils having an oval shape. AF coils 366*a* and 366*b* are fixed to first coil fixed parts 363*a* and 363*b* of FPC 363 via boards 7*a* and 7*b* (see FIG. 13) in a state in which the major axes coincide with the Y direction.

Driver IC 367 is arranged near AF coil 366*a* (specifically, on the + side in the X direction with respect to AF coil 366*a*)

in FPC 363. Driver IC 367 as such detects a magnetic flux from AF magnet 365a toward position detection magnet 369 (see FIG. 11). Then Driver IC 367 controls energizing currents of AF coils 366a and 366b based on the detected value. As described above, in AF actuators 364a and 364b, closed loop control is performed based on the detected value by Driver IC 367. Note that, in lens guide 361, position detection magnet 369 is held near first magnet holding part 361a (specifically, on the + side in the X direction). Further, a Hall element that detects the magnetic flux of AF magnet 365a may be separately provided. In this case, Driver IC 367 may control the energizing currents of AF coils 366a and 366b based on the detected value by the Hall element.

In the case of AF actuators 364a and 364b having the aforementioned configuration, when current flows through AF coils 366a and 366b via FPC 363 under the control by Driver IC 367, a Lorentz force is generated that displaces AF magnets 365a and 365b in the X direction.

Since AF magnets 365a and 365b are fixed to lens guide 361, lens guide 361 is displaced in the X direction (also referred to as third direction) based on the Lorentz force. Note that, adjusting the direction of the current flowing through AF coils 366a and 366b changes the displacement direction of lens guide 361. Autofocusing is performed in the aforementioned manner.

Note that, in the case of the present embodiment, the resonance of lens guide 361 around straight line $L_3$ (see FIG. 14) described above is suppressed by devising the positioning of springs 362a to 362d and lens guide 361 as described above. However, in a case where the resonance cannot be completely eliminated, lens guide 361 may be swung in a direction in which the resonance is canceled, by making a difference between the driving force of AF actuator 364a and the driving force of AF actuator 364b. Note that, making the currents flowing through AF actuators 364a and 364b different can make the driving forces of AF actuators 364a and 364b different.

Second Shake Correction Apparatus

Second shake correction apparatus 37 will be described with reference to FIGS. 11, 12 and 16. Second shake correction apparatus 37 performs shake correction in the Y direction by displacing lens part 33 in the Y direction. Shake correction apparatus 37 as such is arranged in second accommodation space 320 (see FIG. 17) described above.

Second shake correction apparatus 37 includes lens guide 361 described above, the plurality of springs 362a to 362d described above, FPC 363 described above, and the pair of second actuators 370a and 370b. Lens guide 361, springs 362a to 362d, and FPC 363 are shared with AF apparatus 36. Note that, the pair of second actuators 370a and 370b represents the other actuator of the first lens driving actuator and the second lens driving actuator.

Second actuator 370a (see FIG. 11) on the + side in the Y direction is arranged in a state of being overlapped with AF actuator 364a described above in the Z direction with a prescribed gap therebetween. Second actuator 370a as such includes second magnet 371a and second coil 372a.

On the other hand, second actuator 370b (see FIG. 12) on the − side in the Y direction is arranged in a state of being overlapped with AF actuator 364b described above in the Z direction with a prescribed gap therebetween. Second actuator 370b as such includes second magnet 371b, second coil 372b, and second Hall element 373.

By arranging second actuators 370a and 370b and AF actuators 364a and 364b as described above, the centers of the driving forces of second actuators 370a and 370b coincide with the centers of the driving forces of AF actuators 364a and 364b. This configuration makes it difficult for lens guide 361 to be tilt-displaced (that is, swinging displacement about an axis parallel to the Y direction or the Z direction) during autofocusing and shake correction.

Each of second actuators 370a and 370b as described above is a moving magnet-type actuator in which second magnet 371a or 371b is fixed to lens guide 361, which is the movable-side member, and second coil 372a or 372b is fixed to second base 32, which is the fixed-side member, via FPC 363. Second actuators 370a and 370b may be, however, moving coil-type actuators.

The structure of each component of second actuators 370a and 370b as such is substantially the same as a conventionally known structure, and a detailed description thereof is therefore omitted. Hereinafter, the positioning of each component of second actuators 370a and 370b will be described.

Second magnets 371a and 371b are held by second magnet holding parts 368a and 368b of lens guide 361, respectively. In the case of the present embodiment, each of second magnets 371a and 371b is composed of a pair of unipolar magnets magnetized in the Z direction and including one magnetic pole on one side. The directions of the magnetic poles of the pair of unipolar magnets are opposite to each other, and the pair of unipolar magnets is arranged adjacent to each other in the Y direction. Each of second magnets 371a and 371b is like a hexagonal column which is long in the X direction and whose shape, viewed from the Y direction (the state illustrated in FIGS. 11 and 12) is substantially hexagonal.

Each of second magnets 371a and 371b includes a pair of chamfered parts 371e1 and 371e2. Each of the pair of chamfered parts 371e1 and 371e2 is provided on a pair of side surfaces facing each other in the X direction in second magnets 371a and 371b. Further, chamfered part 371e1 and chamfered part 371e2 are inclined in a direction in which the distance therebetween in the X direction decreases toward the − side in the Z direction.

In the assembled state, chamfered part 371e1 and chamfered part 371e2 as such face inclined surface parts 368f1 and 368f2 of the pair of second magnet holding parts 368a and 368b in lens guide 361, respectively.

Each of second coils 372a and 372b is a so-called air-core coil having an oval shape. Second coils 372a and 372b are fixed to second coil fixed parts 363d and 363e of FPC 363, respectively, in a state in which the major axes coincide with the X direction. In this state, second coils 372a and 372b overlap second magnets 371a and 371b, respectively, in the Z direction with a prescribed gap therebetween.

As illustrated in FIG. 12, second Hall element 373 is fixed on the surface of second coil fixed part 363e of FPC 363 and on the outer side in the radial direction of second coil 372b. Note that, second Hall element 373 may be arranged on the inner side in the radial direction of second coil 372b.

In the case of second actuators 370a and 370b having the aforementioned configuration, when current flows through second coils 372a and 372b via FPC 363 under the control by the camera shake correction control section (not illustrated), a Lorentz force is generated that displaces second magnets 371a and 371b in the Y direction. Since each of second magnets 371a and 371b is fixed to lens guide 361, lens guide 361 is displaced in the Y direction based on the Lorentz force. Note that, adjusting the direction of the current flowing through second coils 372a and 372b changes the displacement direction of lens guide 361.

Note that, in the case of the present embodiment, in order to prevent crosstalk between second actuators 370a and 370b and AF actuators 364a and 364b, shield plates 6a and 6b made of a magnetic metal are arranged in a portion in the Z direction between second magnets 371a and 371b and AF magnets 365a and 365b.

Reference Member

Figure 10:
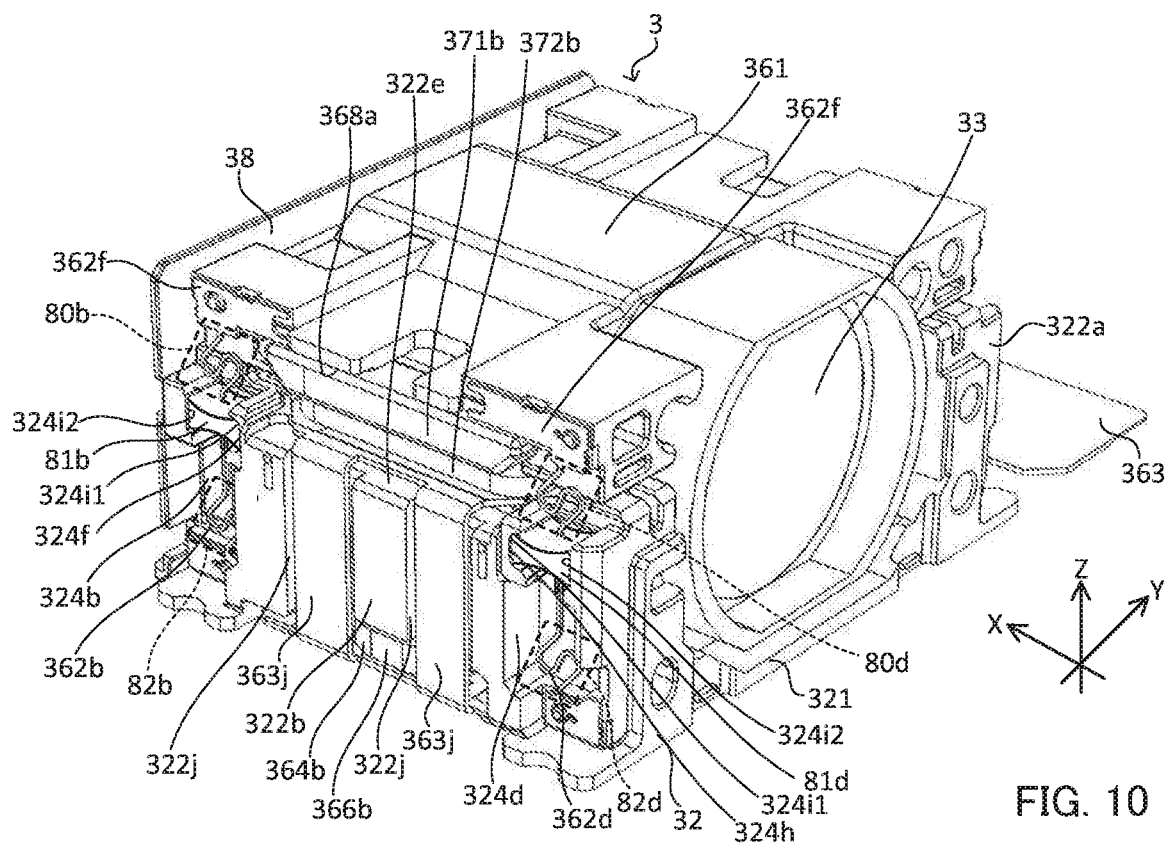
FIG. 10 is a perspective view of the lens module from which some members are omitted, in a state in which the lens module is viewed from an angle different from that in FIG. 9.

Reference member 38 will be described with reference to FIGS. 9 and 10. Reference member 38 is a plate-like member fixed to the end part on the + side in the X direction of second base 32. The side surface on the + side in the X direction of reference member 38 as such serves as a reference surface in the X direction of imaging element module 4 to be described later. Reference member 38 includes a through-hole (not illustrated) that guides light that has passed through lens part 33 to imaging element module 4, in the central portion of reference member 38.

Reference member 38 includes a pair of stopper parts 381a and 381b (see FIGS. 11 and 12) on the side surface on the − side in the X direction. As illustrated in FIGS. 11 and 12, each of the end surfaces (hereinafter, simply referred to as "stopper surfaces") on the − side in the X direction of stopper parts 381a and 381b as such that regulate displacement of lens part 33 on the + side in the X direction during autofocusing to a prescribed range faces a part of lens guide 361 in the X direction with a prescribed gap therebetween, in a state in which lens guide 361 is at the reference position.

Imaging Element Module

Imaging element module 4 is arranged on the + side in the X direction with respect to lens part 33. Imaging element module 4 includes, for example, an imaging element such as a charge-coupled device (CCD) imaging element and a complementary metal oxide semiconductor (CMOS) imaging element. The imaging element of imaging element module 4 captures a subject image formed by lens part 33 and outputs an electrical signal corresponding to the subject image. A printed wiring board (not illustrated) is electrically connected to a board (not illustrated) of imaging element module 4, and power supply to imaging element module 4 is performed and the electrical signal of the subject image captured by imaging element module 4 is output via the printed wiring board. As imaging element module 4 as such, a conventionally known structure can be used.

Operation and Effect of Present Embodiment

As described above, in camera module 1 according to the present embodiment, damping members 80a to 80d, damping members 81a to 81d, and damping members 82a to 82d in this order from a side closer to first fixed part 362f are provided at three points of springs 362a to 362d. Damping members 80a to 80d, damping members 81a to 81d, and damping members 82a to 82d as such contribute to suppression of resonance generated during operation of AF actuators 364a and 364b or during operation of second actuator 370a. In particular, each of damping members 80a to 80d, damping members 81a to 81d, and damping members 82a to 82d contributes to suppression of resonance in different frequency bands.

Specifically, damping members 80a to 80d and damping members 82a to 82d are effective in suppressing resonance in the Z direction of lens part 33. Hereinafter, the reason thereof will be described. When such resonance is generated, springs 362a to 362d expand and contract in the Z direction in accordance with vibration of lens part 33 in the Z direction. In this case, springs 362a to 362d expand and contract as a result of elastic deformation of first bending part 362m and second bending part 362n in the Z direction.

In particular, first bending part 362m on a side closer to first fixed part 362f fixed to lens guide 361 elastically deforms to a greater extent than second bending part 362n. In the case of the present embodiment, the amounts of deformation of first bending part 362m and second bending part 362n are suppressed by providing damping members 80a to 80d and damping members 82a to 82d in first bending parts 362m and second bending parts 362n. Accordingly, the configuration of the present embodiment makes it possible to suppress the resonance in the Z direction of lens part 33 as described above.

Further, damping members 81a to 81d are effective in suppressing resonance in the X direction (the direction of the second optical axis) of lens part 33. Hereinafter, the reason thereof will be described. When such resonance is generated, springs 362a to 362d swing, with a prescribed position in the vicinity of the other end part (that is, the end part on the side of second fixed part 362g) of connection part 362h being as a fulcrum, in accordance with the vibration of lens part 33 in the Z direction. In this case, since gel locking part 362i1 of connection part 362h is arranged at a position close to one end part of connection part 362h, the amount of displacement in the X direction is large. In the case of the present embodiment, the amount of displacement in the X direction of gel locking part 362i1 is suppressed by providing damping members 81a to 81d in gel locking parts 362i1. Accordingly, the configuration of the present embodiment makes it possible to suppress the resonance in the X direction of lens part 33 as described above. Note that, in camera module 1 of the present embodiment, the frequency at which the resonance in the X direction of lens part 33 is generated is approximately 60 Hz. On the other hand, the frequency at which the resonance in the Z direction of lens part 33 is generated is 300 Hz or more. The frequencies as such vary depending on the configuration of the camera module. Accordingly, the frequencies as such do not limit the technical scope of the present invention at all.

The disclosure of Japanese Patent Application No. 2018-019305, filed on Feb. 6, 2018, including the specification, drawings and abstract, is incorporated herein by reference in its entirety.

INDUSTRIAL APPLICABILITY

A camera actuator and a camera module according to the present invention can be mounted on a thin camera-mounted apparatus such as a smartphone, a mobile phone, a digital camera, a notebook computer, a tablet terminal, a portable game machine, and an in-vehicle camera, for example.

REFERENCE SIGNS LIST

1 Camera module
2 Prism module
21 First cover
22 First base
220 Base-side opening
223 First accommodation space
224a, 224b First side wall part
224c1, 224c2 First weir part
224d1, 224d2 Second weir part
224e1, 224e2, 224f1, 224f2 Spring positioning space 224g1, 224g2, 224g3 Protrusion
224h1, 224h2, 224h3 Protrusion
225c First receiver part
225d Second receiver part
226 First positioning protrusion
227 Second positioning protrusion
229 Bottom wall part
23 Prism
231 Optical path bending surface
24 First shake correction apparatus
241 Holder
241a Mounting surface
241f, 241g Opposing wall part
241q, 241r Overhang part
243 Swing support spring
243a, 243b First locking part
243c Second locking part
243d, 243e First through-hole
243f Second through-hole
243g Twist allowing part
243h Spring-side guide surface
243i Continuous part
243j, 243k Continuous part element
243j1 Base end-side continuous part
243j2 Meandering continuous part
244 First actuator (optical path bending member driving actuator)
244a First magnet
244c First coil
244e First Hall element
245 Swing guide member
25 FPC
27 Damping member
3 Lens module
31 Second cover
32 Second base
320 Second accommodation space
321 Bottom part
321a, 321b Bottom through-hole
322a, 322b Second side wall part
322d, 322e Coil mount part
322i Slit
322j Recess
323 Reinforcing plate
324a, 324b, 324c, 324d Spring positioning part
324e, 324f, 324g, 324h Gel positioning part
324i1, 324i2 Holding surface
33 Lens part
36 AF apparatus
361 Lens guide
361a, 361b First magnet holding part
361c1, 361c2 Side surface part
361d Upper surface part
361e1, 361e2 Inclined surface part
362a, 362b, 362c, 362d Spring
362f First fixed part
362g Second fixed part
362h Connection part
362i1, 362i2 Gel locking part
362j Continuous part
362k Annular part
362m First bending part
362n Second bending part
363 FPC
363a, 363b First coil fixed part
363d, 363e Second coil fixed part
363h FPC base
363i First continuous part
363j Second continuous part
364a, 364b AF actuator (first lens driving actuator or second lens driving actuator)
365a, 365b AF magnet
365c1, 365c2 Chamfered part
366a, 366b AF Coil
367 Driver IC
368a, 368b Second magnet holding part
368d1, 368d2 Side surface part
368e Upper surface part
368f1, 368f2 Inclined surface part
369 Position detection magnet
37 Second shake correction apparatus
370a, 370b Second actuator (first lens driving actuator or second lens driving actuator)
371a, 371b Second magnet
371e1, 371e2 Chamfered part
372a, 372b Second coil
373 Second Hall element
38 Reference member
381a, 381b Stopper part
4 Imaging element module
6a, 6b Shield plate
7a, 7b Board
80a, 80b, 80c, 80d Damping member
81a, 81b, 81c, 81d Damping member
82a, 82b, 82c, 82d Damping member

What is claimed is:

1. A camera actuator, comprising:
   a fixed-side member;
   a movable-side member arranged apart from the fixed-side member in a direction orthogonal to an optical axis and holding a lens part;
   a first lens driving actuator that displaces the movable-side member in at least a prescribed direction;
   an elastic support member extending in the direction orthogonal to the optical axis and supporting the movable-side member on the fixed-side member so as to allow displacement of the movable-side member in at least the prescribed direction; and
   a damping member that is gel-like and is provided in the elastic support member,
   wherein:
   the elastic support member includes a first fixed part fixed to the movable-side member, a second fixed part fixed to the fixed-side member, and a connection part connecting the first fixed part and the second fixed part together;
   the connection part includes a maximum displacement portion that is displaced most in a direction of the optical axis when the movable-side member is displaced in the direction of the optical axis; and
   a portion including the maximum displacement portion is provided with the damping member.

2. The camera actuator according to claim 1, wherein first damping member comprises a plurality of damping members and is provided on the maximum displacement portion, and in a half part on a side of the first fixed part in the connection part, respectively.

3. The camera actuator according to claim 2, wherein:
   the connection part is a linear member and includes a first bending part elastically deformable in a length direction of the connection part at a position in the half part on the side of the first fixed part, and the damping member provided in the half part on the side of the first fixed part in the connection part is provided in the first bending part.

4. The camera actuator according to claim 1, wherein the damping member comprises a plurality of damping members and is provided on the maximum displacement portion, in the half part on the side of the first fixed part in the connection part, and in a half part on a side of the second fixed part in the connection part, respectively.

5. The camera actuator according to claim 4, wherein:
the connection part includes a second bending part elastically deformable in the length direction of the connection part at a position in the half part on the side of the second fixed part, and
the damping member provided in the half part on the side of the second fixed part in the connection part is provided in the second bending part.

6. The camera actuator according to claim 1, wherein:
the damping member is provided so as to be spanned between the connection part and the fixed-side member.

7. The camera actuator according to claim 6, wherein the damping member is attached to the fixed-side member in both end parts of the third damping member and is further attached to the connection part in a center part of the third damping member.

8. The camera actuator according to claim 1, wherein the elastic support member is dispersed and arranged around the movable-side member, and a center position of dispersed arrangement of the elastic support member coincides with a center of gravity position of a movable part constituted by the movable-side member and a member displaceable together with the movable-side member.

9. The camera actuator according to claim 1, further comprising a second lens driving actuator that displaces the movable-side member in a direction orthogonal to the prescribed direction.

10. The camera actuator according to claim 9, further comprising:
an optical path bending member provided at a stage prior to the lens part and bending incident light along a direction of a first optical axis in a direction of a second optical axis; and
an optical path bending member driving actuator arranged near the optical path bending member and displacing the optical path bending member, wherein
the prescribed direction coincides with or is orthogonal to the direction of the second optical axis.

11. The camera actuator according to claim 10, wherein:
one of the first lens driving actuator and the second lens driving actuator constitutes an autofocus actuator, and
another of the first lens driving actuator and the second lens driving actuator, and the optical path bending member driving actuator constitute a shake correction actuator.

12. A camera module, comprising:
the camera actuator according to claim 1, and
an imaging element arranged at a stage subsequent to the lens part.

13. A camera-mounted apparatus, comprising:
the camera module according to claim 12, and
a control section that controls the camera module.

14. The camera actuator according to claim 1, wherein:
the fixed-side member includes a bottom part and a pair of wall parts that extend from both end parts of the bottom part to the direction orthogonal to the optical axis.

* * * * *